United States Patent
Morag et al.

(10) Patent No.: US 12,398,071 B2
(45) Date of Patent: Aug. 26, 2025

(54) BUILDING MATERIALS AND METHODS OF MANUFACTURING SAME

(71) Applicant: KENAF VENTURES LTD, Kiryat Ono (IL)

(72) Inventors: Avishay Morag, Kiryat Ono (IL); Zvi Cohen, Haifa (IL)

(73) Assignee: KENAF VENTURES LTD, Kiryat Ono (IL)

( * ) Notice: Subject to any disclaimer, the term of this patent is extended or adjusted under 35 U.S.C. 154(b) by 243 days.

(21) Appl. No.: 17/767,716

(22) PCT Filed: Oct. 19, 2020

(86) PCT No.: PCT/IL2020/051102
§ 371 (c)(1),
(2) Date: Apr. 8, 2022

(87) PCT Pub. No.: WO2021/079363
PCT Pub. Date: Apr. 29, 2021

(65) Prior Publication Data
US 2024/0083812 A1   Mar. 14, 2024

Related U.S. Application Data

(60) Provisional application No. 62/924,704, filed on Oct. 23, 2019.

(51) Int. Cl.
| | |
|---|---|
| C04B 18/24 | (2006.01) |
| C04B 14/06 | (2006.01) |
| C04B 28/26 | (2006.01) |
| C04B 111/00 | (2006.01) |
| C04B 111/52 | (2006.01) |
| E04C 1/41 | (2006.01) |
| E04C 2/04 | (2006.01) |

(52) U.S. Cl.
CPC ............ *C04B 18/248* (2013.01); *C04B 14/06* (2013.01); *C04B 28/26* (2013.01); *E04C 1/41* (2013.01); *E04C 2/049* (2013.01); *C04B 2111/00612* (2013.01); *C04B 2111/52* (2013.01); *C04B 2201/20* (2013.01); *C04B 2201/32* (2013.01); *C04B 2201/50* (2013.01)

(58) Field of Classification Search
CPC ....... C04B 18/248; C04B 14/06; C04B 28/26; C04B 18/28; C04B 28/02; C04B 20/1077; C04B 2111/00612; C04B 2111/52; C04B 2201/20; C04B 2201/32; C04B 2201/50; E04C 1/41; E04C 2/049
See application file for complete search history.

(56) References Cited

FOREIGN PATENT DOCUMENTS

| | | |
|---|---|---|
| CN | 101481227 A | 7/2009 |
| CN | 104675002 A | 6/2015 |
| CN | 106045558 A | 10/2016 |
| CN | 106116469 A | 11/2016 |
| CN | 107933032 A | 4/2018 |
| CN | 109336438 A | 2/2019 |
| CN | 109485342 A | 3/2019 |
| CN | 109745954 A | 5/2019 |
| DE | 19811805 | 9/1999 |
| JP | 2002080257 | 3/2002 |
| JP | 2005249811 | 9/2005 |
| JP | 4960654 | 12/2007 |
| KR | 101150458 | 6/2012 |
| KR | 20180075268 | 7/2018 |

OTHER PUBLICATIONS

Communication and Supplementary European Search Report for European patent application No. 20 87 8726; mailed Dec. 5, 2022; 8 pages.
Office action from China's Patent Office for China patent application No. 202080075405.05; 12 pages, mailed Aug. 17, 2022; and a machine English translation of the office action—13 pages.
Bin Affendi et al., Characteristics of Bonding of Kenaf Fibrous Concrete and Normal Concrete Interface, Nov. 2016, pp. 241 (13 pages).
Azzmi et al., Kenaf Fibrous Concrete Mechanical Properties with Different Fiber Volume Faction, International Journal on Advanced Science, Dec. 28, 2018 (7 pages).
Khoathane et al., Effect of water glass treatment on the mechanical and thermooxidative properties of kenaf and sisal fibres, Journal of Reinforced Plastics and Composites, 2012, 31.19, 1261-69, Dec. 31, 2012 (9 pages).
International Search Report for PCT/IL2020/051102, mailed Jan. 24, 2021 (6 pages).
Written Opinion of the International Searching Authority for PCT/IL2020/051102, mailed Jan. 24, 2021 (11 pages).
Journal of sustainable architecture and civil engineering; vol. 3, No. 16, 2016, pp. 108-120 (9 pages).

*Primary Examiner* — Anthony J Green
(74) *Attorney, Agent, or Firm* — Roach Brown McCarthy & Gruber, P.C.; Kevin D. McCarthy

(57) ABSTRACT

A plant enhanced concrete dry mix comprising (WAV) at least 137.5 parts Kenaf based plant material, derived from *Hibiscus cannabinus*, which is surface treated with sodium silicate (water glass); not more than 122.2 parts sand and not more than 189.4 parts cement. The plant material may be Kenaf branches that contain a soft core and/or heart surrounded by fibrous material.

14 Claims, 16 Drawing Sheets

201 combine water glass (sodium silicate) with Kenaf derived plant material (280)

mix for sufficient time to seal a surface of the Kenaf derived plant material (290)

BUILDING MATERIALS AND METHODS OF MANUFACTURING SAME

FIELD OF THE INVENTION

The invention is in the field of building materials.

BACKGROUND OF THE INVENTION

Many multistory structures are constructed of cast concrete and/or masonry blocks. Conventional concrete and/or masonry blocks do not provide good thermal insulation. Conventional masonry blocks often do not provide sufficient acoustic insulation. In addition, sand and gravel used in conventional concrete and/or masonry blocks are not renewable resources. Since construction is 14.7% of the global GDP, significant amounts of sand and gravel are used.

Green construction is sought by many home buyers, renters, and commercial tenants. However, sustainable and eco-friendly features add to initial construction cost, despite their long-term savings. Green construction includes both the technology to lower a building's carbon footprint and the use of renewable resources and smart building models to reduce environmental impact.

SUMMARY OF THE INVENTION

A broad aspect of the invention relates to use of plant material in concrete and/or masonry blocks. In some embodiments, the plant material is derived from *Hibiscus cannabinus* (commonly referred to as Kenaf Bast or simply Kenaf). Kenaf branches contain a soft core or heart surrounded by fibrous material. According to various exemplary embodiments of the invention the core and/or fibrous material are used.

One aspect of some embodiments of the invention relates to a dry mix based on sand and cement in combination with plant material. According to some exemplary embodiments of the invention the plant material includes Kenaf core. In some embodiments, the plant material is coated with sodium silicate (water glass). In some embodiments, the Kenaf core materials have a larger particle size than the sand. Such a dry mix, when combined with water, is useful in production of masonry blocks and/or to fill construction forms.

In some exemplary embodiments of the invention, the equation:

$$P(D) = \left(\frac{D}{D_{max}}\right)^q$$

Where: D=particle size and q=shape constant is used to calculate particle size distribution (PSD) (equation from A. H. M. Andreasen and J. Andersen (1930) Kolloid-Zeitschrift 50: 217-228).

For normal aggregates, the best range is considered between q=0.25 and q=0.5. According to various exemplary embodiments of the invention 0.5≤q≥1.4 defined PSD zone. In some embodiments, preparation of a mixture with 0.5≤q≥1.4 contributes to an increase in one or more quality parameters.

Kenaf based mixtures with 0.5≤q≥1.4 have contribute to efficiency of PSD. In some embodiments, mixtures with q close to the limits of the range provide superior results. According to various exemplary embodiments of the invention particle morphology, type and combination of ingredients each contribute to properties of the mixture.

In some exemplary embodiments of the invention, use of a small quantity of natural aggregates contributes to suitability of a mixture for one or more applications.

In this context "small quantity" indicates 0-10% of the fillers mixture. "Natural" indicates any aggregate that is excavated such as quartz sand, limestone, Basalt, marble, Dolomite and others. In some embodiments natural aggregates create a 'skeleton' over the 'skeleton' of Kenaf particles and thus stabilize the entire aggregate mix, contributing to an increase in stress transfer abilities and/or contributing to product strength. Alternatively or additionally, an increase in the amount of natural aggregates contributes adversely to thermal conductivity properties.

In some embodiments water glass (sodium silicate) is used for surface treatment of the plant material before introducing it to the mixture. According to various exemplary embodiments of the invention, surface treatment performs one, two or all three of the following functions:
1. Sealing the Kenaf surface which contributes to a reduction in water absorption.
2. Sealing the Kenaf to a avoid potentially harmful chemical reactions between cement hydration byproduct(s) and constituents of Kenaf (e.g. hemicellulose and/lignin) that can leach out of the Kenaf.
3. Creating a bond layer between the Kenaf and the cementitious matrix.

In some embodiments increasing the amount of plant material, such as Kenaf, contributes to an increase in thermal and acoustical insulation without compromising mechanical properties. In other exemplary embodiments of the invention, increasing the amount of cement relative to [plant material (e.g. Kenaf) plus sand] contributes to a decrease in thermal and acoustical insulation.

A second aspect of some embodiments of the invention relates to a dry mix based on gravel and cement in combination with plant material. According to some exemplary embodiments of the invention the plant material includes Kenaf core. In some embodiments the Kenaf core materials have smaller particle size than the gravel. Such a dry mix, when combined with water, is useful in production of masonry blocks and/or to fill construction forms. In some embodiments water glass (sodium silicate) is used for surface treatment of the plant material before introducing it to the mixture.

A third aspect of some embodiments of the invention relates to a dry mix based on sand and cement in combination with powdered plant material. According to some exemplary embodiments of the invention the powdered plant material includes Kenaf core. Such a dry mix, when combined with water, is useful as plaster or render.

A fourth aspect of some embodiments of the invention relates to a masonry block comprising Kenaf derived material and having a specific gravity of 650-790 Kg/m³ and a compressive strength of at least 6.5 Mpa.

A fifth aspect of some embodiments of the invention relates to a masonry block comprising Kenaf derived material and having a specific gravity of 650-790 Kg/m³ and a thermal conductivity of ≤0.11 W/m*K.

A sixth aspect of some embodiments of the invention relates to a masonry block comprising Kenaf derived material and having a specific gravity of 720-790 Kg/m³ and a sound absorption coefficient value of 0.5, or specific gravity of 650-750 Kg/m³ and a sound absorption coefficient value of 0.35. In some embodiments, changing the surface geometry of the product contributes to an improvement in sound absorption.

Alternatively or additionally, according to various exemplary embodiments of the invention, using different aggregates such as Basalt contributes to an improvement sound absorption.

Alternatively or additionally, according to various exemplary embodiments of the invention, a composite with a composition according to the invention is sandwiched between sound absorbent layers.

A seventh aspect of some embodiments of the invention relates to a masonry block or wall or sheet comprising sand and Kenaf derived material.

An eighth aspect of some embodiments of the invention relates to a masonry block or wall or sheet comprising gravel and Kenaf derived material.

A ninth aspect of some embodiments of the invention relates to a sheet of plasterboard (drywall) comprising Kenaf derived material.

A tenth aspect of some embodiments of the invention relates a masonry block or wall or sheet comprising 60% plant material and having a compressive strength of at least 8 MPa.

An eleventh aspect of some embodiments of the invention relates an industrial process which includes sealing plant material with sodium silicate (water glass) and mixing with cement and sand and/or gravel to produce a dry mix. In some embodiments the plant material is derived from Kenaf. In some embodiments water is added to the dry mix and the resultant plant based concrete is poured into a construction form or used to make masonry blocks.

A twelfth aspect of some embodiments of the invention relates to using water glass (sodium silicate) to seal a surface of Kenaf derived plant material.

A thirteenth aspect of some embodiments of the invention relates to powder milled from Kenaf core plus bast with D90=220 μm and D50=75 μm-90 μm.

It will be appreciated that the various aspects described above relate to solution of technical problems associated with depreciation of sand and gravel reserves.

Alternatively or additionally, it will be appreciated that the various aspects described above relate to solution of technical problems related to improving thermal insulation of concrete structures.

Alternatively or additionally, it will be appreciated that the various aspects described above relate to solution of technical problems related to improving acoustic insulation of concrete structures.

Unless otherwise specified, all recipes that refer to "parts" are "parts by weight".

In some exemplary embodiments of the invention there is provided a plant enhanced concrete dry mix including (W/W): (a) at least 137.5 parts Kenaf based plant material surface treated with sodium silicate (water glass); (b) not more than 122.2 parts sand; and (c) not more than 189.4 parts cement. In some embodiments, the ratio of water glass to Kenaf based plant material is 0.96. Alternatively or additionally, in some embodiments the dry mix includes 110 parts sand or less.

Alternatively or additionally, in some embodiments the dry mix includes at least 70.1 parts Kenaf based plant material. Alternatively or additionally, in some embodiments the Kenaf based plant material includes Kenaf core material. Alternatively or additionally, in some embodiments the dry mix includes 189.4 parts cement or less. Alternatively or additionally, in some embodiments the dry mix includes less than 67.5 parts sodium silicate.

In some exemplary embodiments of the invention there is provided a plant enhanced concrete dry mix including (W/W): (a) at least 126.3 parts Kenaf based plant material sealed with sodium silicate (water glass); (b) not more than 67.7 parts gravel; and (c) not more than 168 parts cement. In some embodiments, the ratio of sodium silicate to Kenaf based plant material is 0.96. Alternatively or additionally, in some embodiments the dry mix includes 67.8 parts gravel or less. Alternatively or additionally, in some embodiments the dry mix includes at least 64.5 parts Kenaf based plant material. Alternatively or additionally, in some embodiments the Kenaf based plant material includes Kenaf core material. Alternatively or additionally, in some embodiments the dry mix includes less than 168 parts cement. Alternatively or additionally, in some embodiments the dry mix includes less than 61.8 parts sodium silicate.

In some exemplary embodiments of the invention there is provided a plant enhanced plaster dry mix including (W/W): (a) at least 14.6 parts plant fiber (chopped to 0.2-2 mm length, from the plant bast) and at least 78.6 parts Kenaf powder; (b) not more than 43.4 parts sand; and (c) not more than 109.4 parts cement. In some embodiments, the plant fiber includes plant bast material chopped to 0.2-1 mm length. Alternatively or additionally, in some embodiments the dry mix includes plant bast material chopped to 1-2 mm length. Alternatively or additionally, in some embodiments the dry mix includes 29 parts sand or less. Alternatively or additionally, in some embodiments the dry mix includes at least 78.6 parts Kenaf powder. Alternatively or additionally, in some embodiments the dry mix includes at least 19 parts Kenaf fiber. Alternatively or additionally, in some embodiments the dry mix includes quick lime.

In some exemplary embodiments of the invention there is provided a masonry block including at least 15.6% plant material by weight and having a specific gravity of 650-790 Kg/m$^3$ and a compressive strength of at least 6.5 Mpa. In some embodiments, the plant material is from Kenaf. Alternatively or additionally, in some embodiments the block includes at least 15% Na silicate. Alternatively or additionally, in some embodiments the Na silicate seals the plant material. Alternatively or additionally, in some embodiments the block includes not more than 27.2% sand. Alternatively or additionally, in some embodiments the block includes not more than 18.7% gravel. Alternatively or additionally, in some embodiments the block includes not more than 46.4% cement.

In some exemplary embodiments of the invention there is provided a masonry block including at least 15.6% plant material and having a specific gravity of 650-790 Kg/m$^3$ and a thermal conductivity of not more than about 0.11 W/m*K. In some embodiments, the plant material is from Kenaf. Alternatively or additionally, in some embodiments the block includes at least 15% Na silicate. Alternatively or additionally, in some embodiments the Na silicate seals the plant material. Alternatively or additionally, in some embodiments the block includes not more than 27.2% sand. Alternatively or additionally, in some embodiments the block includes not more than 18.7% gravel. Alternatively or additionally, in some embodiments the block includes not more than 46.4% cement.

In some exemplary embodiments of the invention there is provided a masonry block including at least 15.6% plant material and having a specific gravity of 720-790 Kg/m$^3$ and a sound absorption coefficient value of 0.5. In some embodiments, the block includes at least 17.8% plant material and has a specific gravity of 650-750 Kg/m³ and a sound absorption coefficient value of 0.35. Alternatively or additionally, in some embodiments the plant material is from Kenaf core. Alternatively or additionally, in some embodiments the block includes at least 15% Na silicate, optionally at least 17.1% Na silicate. Alternatively or additionally, in some embodiments the block includes not more than 27.2% sand. Alternatively or additionally, in some embodiments the block includes not more than 42.2% cement, optionally not more than 46.4% cement. Alternatively or additionally, in some embodiments the block has an acoustic absorption value of at least 0.35.

In some exemplary embodiments of the invention there is provided a plant enhanced block or wall or drywall sheet including (W/W): (a) at least 137.7 parts plant material sealed with sodium silicate (water glass); (b) not more than 122.2 parts sand; and (c) not more than 189.4 parts cement. In some embodiments, the plant material includes Kenaf derived material. Alternatively or additionally, in some embodiments the Kenaf derived material includes Kenaf core material. Alternatively or additionally, in some embodiments the block or wall or drywall sheet has a specific gravity of 650-750 Kg/m³. Alternatively or additionally, in some embodiments the block or wall or drywall sheet includes 110 parts sand or less. Alternatively or additionally, in some embodiments the block or wall or drywall sheet includes 70.1 parts plant material. Alternatively or additionally, in some embodiments the plant material has an average length of 1-2 mm. Alternatively or additionally, in some embodiments the block or wall or drywall sheet includes less than 189.3 parts cement. Alternatively or additionally, in some embodiments the block or wall or drywall sheet includes less than 67.5 parts sodium silicate.

In some exemplary embodiments of the invention there is provided a plant enhanced block or wall or drywall sheet including (W/W): (a) at least 126.3 parts plant material sealed with sodium silicate (water glass); (b) not more than 67.7 parts gravel; and (c) not more than 168 parts cement. In some embodiments, the plant material includes Kenaf derived material. Alternatively or additionally, in some embodiments the Kenaf derived material includes Kenaf core material. Alternatively or additionally, in some embodiments the block or wall or drywall sheet has a specific gravity of 720-790 Kg/m³. Alternatively or additionally, in some embodiments the block or wall or drywall sheet includes 67.8 parts gravel or less. Alternatively or additionally, in some embodiments the block or wall or drywall sheet includes less than 168 parts cement. Alternatively or additionally, in some embodiments the block or wall or drywall sheet includes less than 61.8 parts sodium silicate.

In some exemplary embodiments of the invention there is provided a plant enhanced plaster sheet (drywall) including (W/W): (a) at least 7.4 parts plant fiber and at least 264.1 parts Kenaf powder; (b) not more than 389.6 parts sand; and (c) not more than 1139.3 parts cement. In some embodiments, a ratio of water glass to Kenaf based plant material is between 0.5 and 10. Alternatively or additionally, in some embodiments the plaster sheet includes 200 parts sand or less. Alternatively or additionally, in some embodiments the plaster sheet includes at least 264.1 parts Kenaf powder. Alternatively or additionally, in some embodiments the plant fiber includes Kenaf fiber. Alternatively or additionally, in some embodiments the plaster sheet includes less than 80 parts cement. Alternatively or additionally, in some embodiments the plaster sheet has a compressive strength of at least 6 Mpa. Alternatively or additionally, in some embodiments the plaster sheet has a thermal conductivity of at most 0.12 W/m*K.

In some exemplary embodiments of the invention there is provided an industrial process including: (a) sealing plant material with sodium silicate (water glass) while mixing and drying to produce sealed plant material; and (b) mixing with cement and aggregate to produce dry mix. In some embodiments, the plant material includes Kenaf derived material. Alternatively or additionally, in some embodiments the Kenaf derived material includes Kenaf core material. Alternatively or additionally, in some embodiments the Kenaf derived material includes Kenaf fibers. Alternatively or additionally, in some embodiments the aggregate includes sand. Alternatively or additionally, in some embodiments the aggregate includes gravel. Alternatively or additionally, in some embodiments the process includes adding water to the dry mix to produce a paste. Alternatively or additionally, in some embodiments the process includes pouring the paste into a mold or a form. Alternatively or additionally, in some embodiments the process includes setting the paste in the mold or the form and removing the mold or the form. Alternatively or additionally, in some embodiments the process includes compressing the paste within the mold or form. Alternatively or additionally, in some embodiments the process includes vibrating the paste within the mold or form.

In some exemplary embodiments of the invention there is provided a method including: (a) combining water glass (sodium silicate) with Kenaf derived plant material; and (b) mixing for sufficient time to seal a surface of the Kenaf derived plant material. In some embodiments the sufficient time is at least 3 minutes. Alternatively or additionally, in some embodiments the sufficient time is at least 4.5 minutes. Alternatively or additionally, in some embodiments the Kenaf derived plant material includes Kenaf core material. Alternatively or additionally, in some embodiments the Kenaf derived plant material includes Kenaf Powder with D90=220 μm, D50=75-90 μm; the powder milled from core plus bast. Alternatively or additionally, in some embodiments the powder has a core:bast ratio equal to fully matured Kenaf. Alternatively or additionally, in some embodiments the water glass has a silicon to sodium ratio between 2.3:1 and 2.4:1. Alternatively or additionally, in some embodiments the water glass has a pH of 10.5 to 11.5. Alternatively or additionally, in some embodiments the water glass has a solid content of 36.5-41.8%. Alternatively or additionally, in some embodiments the water glass has a specific density of 1.4-1.46 gr/cc. Alternatively or additionally, in some embodiments the water glass has a liquid density of 41-46 Bé.

In some exemplary embodiments of the invention there is provided a composition including: powder milled from Kenaf core plus bast with D90=220 μm and D50=75 μm-90 μm. In some embodiments, the powder has a core:bast ratio equal to fully matured Kenaf (about 3:2). Alternatively or additionally, in some embodiments the powder includes water glass (sodium silicate). Alternatively or additionally, in some embodiments the water glass seals a surface of at least some particles of the powder.

In some exemplary embodiments of the invention there is provided a masonry block including at most 60% plant material and having a compressive strength of at least 8 MPa. According to various exemplary embodiments of the invention the block includes 1%, 5%, 10%, 20%, 30%, 40%, 50%, 55% or intermediate or greater percentages of plant material. In some embodiments, the plant material includes Kenaf derived material. Alternatively or additionally, in some embodiments the Kenaf derived material includes Kenaf core. Alternatively or additionally, in some embodiments the block includes at least 40% cement. Alternatively or additionally, in some embodiments the block has a water/cement ratio of not more than 0.38.

For purposes of this specification and the accompanying claims, the phrase "not more than" indicates that the recited material is present.

Unless otherwise defined, all technical and scientific terms used herein have the same meaning as commonly understood by one of ordinary skill in the art to which this invention belongs. Although suitable methods and materials are described below, methods and materials similar or equivalent to those described herein can be used in the practice of the present invention. In case of conflict, the patent specification, including definitions, will control. All materials, methods, and examples are illustrative only and are not intended to be limiting.

As used herein, the terms "comprising" and "including" or grammatical variants thereof are to be taken as specifying inclusion of the stated features, integers, actions or components without precluding the addition of one or more additional features, integers, actions, components or groups thereof. This term is broader than, and includes the terms "consisting of" and "consisting essentially of" as defined by the Manual of Patent Examination Procedure of the United States Patent and Trademark Office. Thus, any recitation that an embodiment "includes" or "comprises" a feature is a specific statement that sub embodiments "consist essentially of" and/or "consist of" the recited feature.

The phrase "consisting essentially of" or grammatical variants thereof when used herein are to be taken as specifying the stated features, integers, steps or components but do not preclude the addition of one or more additional features, integers, steps, components or groups thereof but only if the additional features, integers, steps, components or groups thereof do not materially alter the basic and novel characteristics of the claimed composition, device or method.

The phrase "adapted to" as used in this specification and the accompanying claims imposes additional structural limitations on a previously recited component.

The term "method" refers to manners, means, techniques and procedures for accomplishing a given task including, but not limited to, those manners, means, techniques and procedures either known to, or readily developed from known manners, means, techniques and procedures by practitioners of architecture and/or computer science.

BRIEF DESCRIPTION OF THE DRAWINGS

In order to understand the invention and to see how it may be carried out in practice, embodiments will now be described, by way of non-limiting example only, with reference to the accompanying figures. In the figures, identical and similar structures, elements or parts thereof that appear in more than one figure are generally labeled with the same or similar references in the figures in which they appear. Dimensions of components and features shown in the figures are chosen primarily for convenience and clarity of presentation and are not necessarily to scale. The attached figures are.

DETAILED DESCRIPTION OF EMBODIMENTS

Embodiments of the invention relate to plant based materials with defined properties, mixtures containing the plant based material, methods and/or industrial processes for making such mixtures, and materials produced from such mixtures. In some embodiments, the plant based materials comprise one or more fractions of the Kenaf plant. In some embodiments, the fractions are ground or milled to achieve particles with a desired average size and/or size distribution.

Specifically, some embodiments of the invention can be used to produce building materials such as concrete and/or plaster and/or masonry blocks and/or bricks.

OVERVIEW

Figure 1:
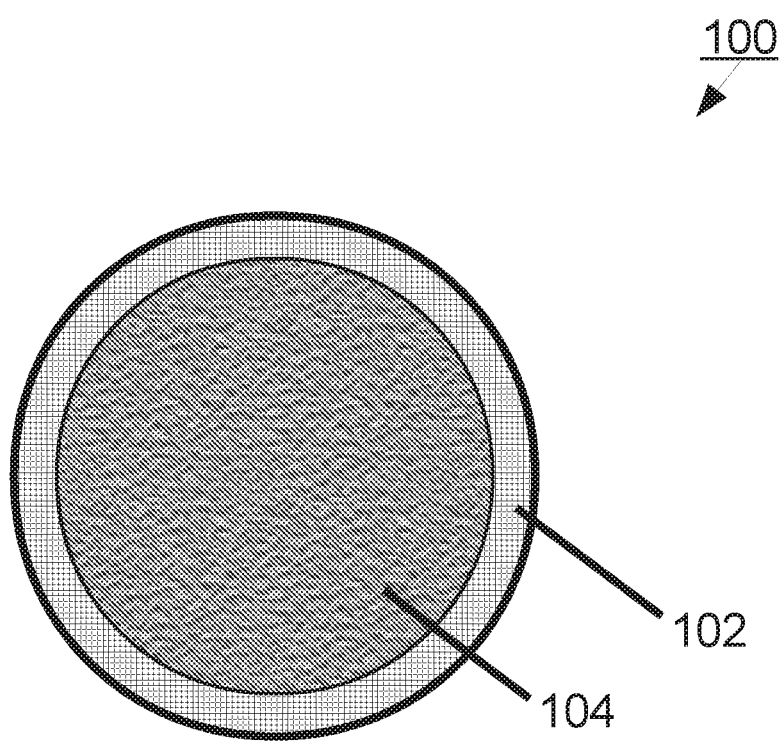
FIG. 1 is a schematic representation of a cross section of a Kenaf branch.

FIG. 1 is a schematic representation of a cross section of a Kenaf branch (or stem) indicated generally as 100. Branch 100 includes an outer bast layer 102 and an inner core layer 104.

Bast 102 constitutes about 40% of the plant. Multicellular fibers separated from the bast consist of several individual fiber cells stuck together. Each bast fibre cells is roughly 2-6 mm long and slender with a thick cell wall (6.3 µm). Core 104 makes up about 60% of the plant and has thick (≈38 µm) but short (0.5 mm) and thin-walled (3 µm) fibre cells.

In various experimental examples described below, different Kenaf derived materials were used:

Kenaf Powder: (D90=220 µm, D50=75-90 µm, milled from core+bast having ratio based on equal length of fully matured Kenaf) (claims) hereinafter "Kenaf Powder", Kenaf bast material (Kenaf Fiber) chopped to 1-2 mm length (Example 1)

Kenaf coarse particles of 1-4 mm

Kenaf powder from core of 0-0.3 mm

Kenaf powder from entire stem of 0-0.85 mm

From Example 1 Table 1a

Kenaf Core 0.92; 0.95, 0.93
Kenaf powder

Example 2

Kenaf flakes
Kenaf core
Kenaf powder

From Example 3

Kenaf core
Kenaf powder
Kenaf Fiber

From Example 4

Kenaf core
Kenaf powder
Kenaf Fiber

From Example 7

Kenaf powder
Kenaf Fiber

Example 8

Kenaf core below 2.36 mm size

Example 9 and 10

Kenaf powder
Kenaf Fibers

Example 11

Kenaf Core

Example 12

Kenaf Fibers
Kenaf Powder
Kenaf Core

Example 13

Kenaf Fibers
Kenaf Powder
Kenaf Core

Exemplary Industrial Process

Figure 2A:
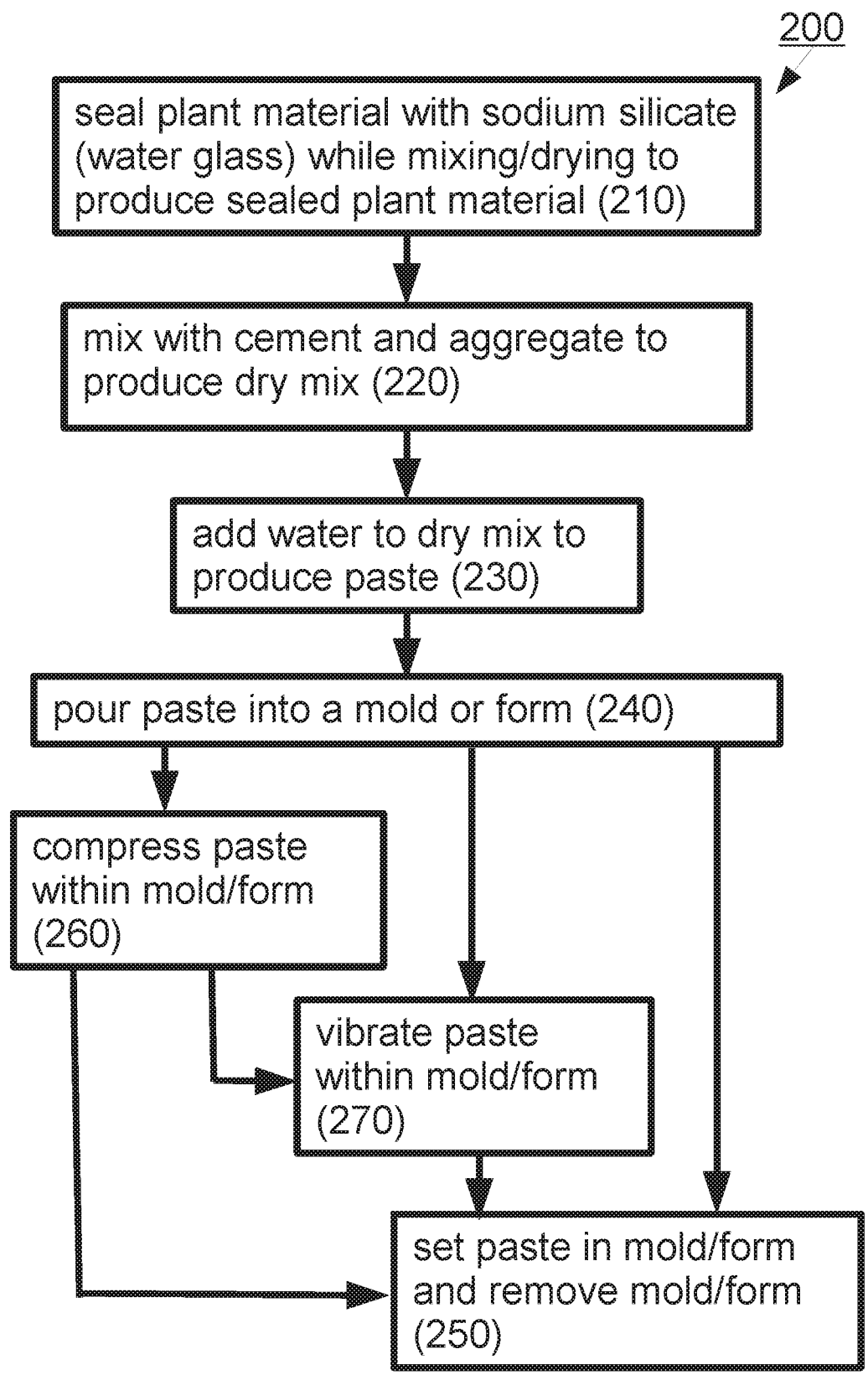
FIG. 2a is a flow diagram of an industrial process according to some exemplary embodiments of the invention.

FIG. 2a is a flow diagram of an industrial process for producing building materials, indicated generally as 200, according to some exemplary embodiments of the invention. Depicted exemplary process 200 includes sealing 210 plant material with sodium silicate (water glass) while mixing and drying to produce sealed plant material and Mixing 220 with cement and aggregate to produce dry mix. In some exemplary embodiments of the invention, the plant material includes Kenaf derived material. According to various exemplary embodiments of the invention, the Kenaf derived material includes Kenaf core material and/or Kenaf fibers. Alternatively or additionally, according to various exemplary embodiments of the invention, the aggregate includes sand and/or gravel.

In some exemplary embodiments of the invention, the dry mix is a final product which is sold for preparation of wet concrete and/or plaster and/or masonry blocks and/or bricks.

In other exemplary embodiments of the invention, the dry mix is subject to further processing. In some embodiments, method 200 includes adding 230 water to the dry mix to produce a paste (for plaster) or semi-dry paste (for concrete).

In some embodiments, process 200 includes pouring 240 the paste or semi-dry paste into a mold or form. According to various exemplary embodiments of the invention the size and shape of the mold will determine whether a masonry block, brick, structural element (e.g. wall or column) or sheet is formed. Alternatively or additionally, according to various exemplary embodiments of the invention, the composition of the dry mix and/or paste is adjusted in view of the mold or form and the intended product.

In the depicted embodiment, process 200 includes setting 250 the paste in the mold or form and removing the mold or form. In some embodiments, process 200 includes compressing 260 the paste within the mold or form and/or vibrating 270 the paste within the mold or form.

In some embodiments, compressing 260 is conducted at low pressure (e.g. by hand) and with vibration 270.

In some cases if compression 260 is conducted with excessive pressure materials absorbed by the Kenaf are squeezed from it and/or the sodium silicate seal is disrupted. In other cases if compression 260 is conducted with insufficient pressure the resultant concrete or masonry block may not be sufficiently dense and/or sufficiently hard.

In some embodiments which employ vibration 270, vibration has the greatest positive effect when conducted during compression 260.

Exemplary Method

Figure 2B:
FIG. 2b is a flow diagram of a method according to some exemplary embodiments of the invention.

FIG. 2b is a flow diagram of a method for sealing Kenaf derived plant material indicated generally as 201m according to some exemplary embodiments of the invention.

Depicted exemplary method 201 includes combining 280 water glass (sodium silicate) with Kenaf derived plant material and mixing 290 for sufficient time to seal a surface of the Kenaf derived plant material. In some embodiments, the sufficient time is at least 3 minutes, at least 3.5 minutes, at least 4 minutes, at least 4.5 minutes, at least 5 minutes, at least 10 minutes, at least 30 minutes, at least 45 minutes or at least 60 minutes. Alternatively or additionally, in some embodiments, the sufficient time is at less than 3 minutes, less than 3.5 minutes, less than 4 minutes, less than 4.5 minutes, less than 5 minutes, less than 10 minutes, less than 30 minutes, less than 45 minutes or less than 60 minutes. In some embodiments, overly long mixing times contribute to a reduction in sealing efficiency.

In some embodiments of method 201, the Kenaf derived plant material includes Kenaf core material. In some embodiments of method 201, the Kenaf derived plant material includes Kenaf Powder with D90=220 μm, D50=75-90 μm; the powder milled from core plus bast. In some embodiments of method 201, powder has a core:bast ratio equal to fully matured Kenaf (about 3:2).

Alternatively or additionally, in some embodiments of method 201, the water glass has a silicon to sodium ratio between 2.3:1 and 2.4:1 and/or the water glass has a pH of 10.5 to 11.5, and/or the water glass has a solid content of 36.5-41.8% and/or the water glass has a specific density of 1.4-1.46 gr/cc and/or the water glass has a liquid density of 41-46 Be.

First Exemplary Dry Mix

In some exemplary embodiments of the invention there is provided a plant enhanced concrete dry mix comprising (W/W):

at least 137.5 parts Kenaf based plant material surface treated with sodium silicate (water glass); not more than 122.2 parts sand; and not more than 189.4 parts cement.

In some exemplary embodiments of the invention, a dry mix of this type is mixed with water and used to prepare masonry blocks or bricks. According to various exemplary embodiments of the invention, such blocks or bricks are useful in exterior walls and/or interior walls. A dry mix of this type can also be used for large thickness drywall panels. According to various exemplary embodiments of the invention the drywall panels have a thickness of 2 cm, 3 cm, 4 cm, 5 cm, 6 cm, 7 cm, 8 cm, 9 cm, 10 cm, 20 cm or 30 cm or intermediate or greater thickness. In some embodiments the drywall panel is encapsulated with cardboard (as in gypsum boards). In some embodiments, encapsulation with cardboard contributes to an ability to form drywall panels with lower thickness.

In some exemplary embodiments of the invention, the ratio of water glass to Kenaf based plant material is 0.96. According to various exemplary embodiments of the invention the ratio of water glass to Kenaf based plant material is greater than 0.5, greater than 1, greater than 1.5, greater than 2, greater than 2.5, greater than 3, greater than 3.5, greater than 4, greater than 4.5, greater than 5, greater than 5.5, greater than 6, greater than 6.5, greater than 7, greater than 7.5, greater than 8, greater than 8.5, greater than 9, greater than 9.5, greater than 10 or intermediate or greater ratios. Alternatively or additionally, according to various exemplary embodiments of the invention, the ratio of water glass to Kenaf based plant material is less than 10, less than 9.5, less than 9, less than 8.5, less than 8, less than 7.5, less than 7, less than 6.5, less than 6, less than 5.5, less than 5, less than 4.5, less than 4, less than 3.5, less than 3, less than 2.5, less than 2, less than 1.5, less than 1.0, less than 0.5 or lesser or intermediate ratios. In some exemplary embodiments of the invention, the of water glass to Kenaf based plant material ratio is between 0.5 and 1.5.

Alternatively or additionally, in some embodiments the water glass used is a sodium silicate type, having silicon to sodium ratio between 2.3:1 and 2.4:1, pH of 10.5 to 11.5, solid content of 36.5-41.8%, specific density of 1.4-1.46 gr/cc, liquid density of 41-46 Bé.

Alternatively or additionally, in some embodiments the plant enhanced concrete dry mix includes 122.2 parts sand or less. According to various exemplary embodiments of the invention, the dry mix includes 135 parts, 130 parts, 125 parts, 120 parts, 115 parts, 110 parts, 105 parts or 100 parts or intermediate or lesser numbers of parts of sand. In some embodiments, a reduction in the number of parts of sand contributes to a reduction in concrete strength.

Alternatively or additionally, in some embodiments the plant enhanced concrete dry mix includes at least 70.1 parts Kenaf based plant material. According to various exemplary embodiments of the invention, the dry mix includes 50 parts, 55 parts, 60 parts, 65 parts, 70 parts, 75 parts, 80 parts or intermediate or lesser number of parts of Kenaf based plant material. Alternatively or additionally, in some embodiments the plant enhanced concrete dry mix the Kenaf based plant material includes Kenaf core material Alternatively or additionally, in some embodiments the plant enhanced concrete dry mix includes 189.4 parts cement or less. According to various exemplary embodiments of the invention, the dry mix includes 225 parts, 220 parts, 210 parts, 205 parts, 200 parts, 195 parts, 190 parts, 185 parts or 180 parts or intermediate or lesser numbers of parts cement. Alternatively or additionally, in some embodiments the plant enhanced concrete dry mix includes less than 67.5 parts sodium silicate. According to various exemplary embodiments of the invention, the dry mix includes 75 parts, 72 parts, 70 parts, 68 parts, 66 parts, 64 parts, 62 parts, 60 parts or 58 parts or intermediate or lesser numbers of parts sodium silicate.

Second Exemplary Dry Mix

In some exemplary embodiments of the invention there is provided a plant enhanced concrete dry mix comprising (W/W): at least 126.3 parts Kenaf based plant material sealed with sodium silicate (water glass); not more than 67.7 parts gravel; and not more than 168 parts cement. In some embodiments, a dry mix of this type is useful in preparation of masonry blocks and/or bricks.

Alternatively or additionally, in some embodiments the plant enhanced concrete dry mix has a ratio of sodium silicate to Kenaf based plant material of 0.96. According to various exemplary embodiments of the invention the ratio of water glass to Kenaf based plant material is greater than 0.5, greater than 1, greater than 0.5, greater than 1, greater than 1.5, greater than 2, greater than 2.5, greater than 3, greater than 3.5, greater than 4, greater than 4.5, greater than 5, greater than 5.5, greater than 6, greater than 6.5, greater than 7, greater than 7.5, greater than 8, greater than 8.5, greater than 9, greater than 9.5, greater than 10 or intermediate or greater ratios. Alternatively or additionally, according to various exemplary embodiments of the invention, the ratio of water glass to Kenaf based plant material is less than 10, less than 9.5, less than 9, less than 8.5, less than 8, less than 7.5, less than 7, less than 6.5, less than 6, less than 5.5, less than 5, less than 4.5, less than 4, less than 3.5, less than 3, less than 2.5, less than 2, less than 1.5, less than 1.0, less than 0.5 or lesser or intermediate ratios. In some exemplary embodiments of the invention, the ratio is about 0.5 to 1.5

In some embodiments the water glass used, and its method of application, are as described above in the context of the first exemplary dry mix.

Alternatively or additionally, in some embodiments the plant enhanced concrete dry mix includes 67.8 parts gravel or less. According to various exemplary embodiments of the invention, the dry mix includes 90 parts, 85 parts, 80 parts, 120 parts, 75 parts, 70 parts, 65 parts or 60 parts or intermediate or lesser numbers of parts of gravel. In some embodiments, a reduction in the number of parts of gravel contributes to a reduction in concrete strength.

Alternatively or additionally, in some embodiments the plant enhanced concrete dry mix includes at least 64.5 parts Kenaf based plant material. According to various exemplary embodiments of the invention, the dry mix includes 50 parts, 55 parts, 60 parts, 65 parts, 70 parts, 75 parts, 80 parts or intermediate or lesser number of parts of Kenaf based plant material.

Alternatively or additionally, in some embodiments the Kenaf based plant material comprises Kenaf core material.

Alternatively or additionally, in some embodiments the plant enhanced concrete dry mix includes less than 168 parts cement. According to various exemplary embodiments of the invention, the dry mix includes 225 parts, 220 parts, 210 parts, 205 parts, 200 parts, 195 parts, 190 parts, 185 parts, 180 parts, 175 parts, 170 parts or 165 parts or intermediate or lesser numbers of parts cement.

Alternatively or additionally, in some embodiments the plant enhanced concrete dry mix includes less than 61.8 parts sodium silicate. According to various exemplary embodiments of the invention, the dry mix includes 75 parts, 72 parts, 70 parts, 68 parts, 66 parts, 64 parts, 62 parts, 60 parts or 58 parts or intermediate or lesser numbers of parts sodium silicate.

Third Exemplary Dry Mix

In some exemplary embodiments of the invention there is provided a plant enhanced plaster dry mix comprising (W/W):

at least 14.6 parts plant fiber (chopped to 1-2 mm length, from the plant bast) and at least 78.6 parts Kenaf powder; not more than 43.4 parts sand; and not more than 109.4 parts cement.

In some embodiments, a dry mix of this type is useful in preparation of plaster and render by mixing with water. In some embodiments, render is used in an outer layer, which imposes more stringent limits on material properties.

Alternatively or additionally, in some embodiments the plant fiber comprises plant (Kenaf) bast material chopped to 1-2 mm length. Alternatively or additionally, in some embodiments the plaster dry mix includes 43.4 parts sand or less. According to various exemplary embodiments of the invention, the dry mix includes 45 parts, 43 parts, 40 parts, 36 parts, 32 parts, 29 parts, 26 parts or 23 parts or intermediate or greater numbers of parts sand.

Alternatively or additionally, in some embodiments the plaster dry mix includes at least 78.6 parts Kenaf powder. According to various exemplary embodiments of the invention, the dry mix includes 60 parts, 65 parts, 70 parts, 72 parts, 74 parts, 76 parts, 78 parts or 80 parts or intermediate or greater numbers of parts Kenaf powder.

Alternatively or additionally, in some embodiments the plaster dry mix includes at least 14.6 parts Kenaf fiber. According to various exemplary embodiments of the invention, the dry mix includes 6 parts, 8 parts, 10 parts, 12 parts, 14 parts, 16 parts, 18 parts or 20 parts or intermediate or lesser numbers of parts Kenaf fiber.

Alternatively or additionally, in some embodiments the plaster dry mix includes quick lime. In some embodiments, addition of quick lime to the dry mix contributes to an ability to reduce the number of parts of cement.

Exemplary Masonry Block

In some exemplary embodiments of the invention there is provided a masonry block comprising at least 15.6% plant material by weight and having a specific gravity of 650-790 Kg/m$^3$ and a compressive strength of at least 6.5 Mpa. In some exemplary embodiments of the invention, the plant material is from Kenaf.

Alternatively or additionally, in some embodiments the masonry block includes at least 15% Na silicate. In some embodiments, the Na silicate seals the plant material.

Alternatively or additionally, in some embodiments the masonry block includes not more than 27.2% sand.

Alternatively or additionally, in some embodiments the masonry block includes not more than 18.7% gravel.

Alternatively or additionally, in some embodiments the masonry block includes not more than 46.4% cement.

According to various exemplary embodiments of the invention the percentages of sand, cement and gravel are each independently not more than 10%, not more than 20%, not more than 30%, not more than 40%, not more than 50%, not more than 60%, not more than 70%, not more than 80%, not more than 90% or intermediate or greater percentages.

Second Exemplary Masonry Block

In some exemplary embodiments of the invention there is provided a masonry block comprising at least 15.6% plant material and having a specific gravity of 650-790 Kg/m$^3$ and a thermal conductivity of not more than about 0.11 W/m*K. In some embodiments, the plant material is from Kenaf.

Alternatively or additionally, in some embodiments the masonry block includes at least 15% Na silicate. In some embodiments, the Na silicate seals the plant material.

Alternatively or additionally, in some embodiments the masonry block includes not more than 27.2% sand.

Alternatively or additionally, in some embodiments the masonry block includes not more than 18.7% gravel.

Alternatively or additionally, in some embodiments the masonry block includes not more than 46.4% cement.

According to various exemplary embodiments of the invention the percentages of sand, cement and gravel are each independently not more than 10%, not more than 20%, not more than 30%, not more than 40%, not more than 50%, not more than 60%, not more than 70%, not more than 80%, not more than 90% or intermediate or greater percentages.

Third and Fourth Exemplary Masonry Blocks

In some exemplary embodiments of the invention there is provided a masonry block including at least 15.6% plant material and having a specific gravity of 720-790 Kg/m$^3$ and a sound absorption coefficient value of 0.5. In some embodiments, the plant material is from Kenaf. In some embodiments, the masonry block includes at least 15% Na silicate. Alternatively or additionally, in some embodiments the masonry block includes not more than 27.2% sand. Alternatively or additionally, in some embodiments the masonry block includes not more than 20.7% gravel. Alternatively or additionally, in some embodiments the masonry block includes not more than 42.2% cement. Alternatively or additionally, in some embodiments the masonry block has an acoustic absorption value of at least 0.35, optionally at least 0.5.

In some exemplary embodiments of the invention there is provided a masonry block comprising at least 17.8% plant material and having a specific gravity of 650-750 Kg/m$^3$ and a sound absorption coefficient value of 0.35. In some embodiments, the plant material is from Kenaf Core.

In some embodiments, the masonry block includes at least 17.1% Na silicate. Alternatively or additionally, in some embodiments the masonry block includes not more than 29.7% sand. Alternatively or additionally, in some embodiments the masonry block includes not more than 18.7% gravel. Alternatively or additionally, in some embodiments the masonry block includes not more than 46.4% cement. Alternatively or additionally, in some embodiments the masonry block has an acoustic absorption value of at least 0.35.

Exemplary Block or Wall or Sheet

In some exemplary embodiments of the invention there is provided plant enhanced block or wall or drywall sheet comprising (WAY): at least 137.7 parts plant material sealed with sodium silicate (water glass);

not more than 122.2 parts sand; and not more than 189.4 parts cement.

In some embodiments of the plant enhanced block or wall or drywall sheet, the plant material comprises Kenaf derived material.

In some embodiments of the plant enhanced block or wall or drywall sheet, the Kenaf derived material comprises Kenaf core material.

Some embodiments of the plant enhanced block or wall or drywall sheet have a specific gravity of 650-750 Kg/m$^3$.

Some embodiments of the plant enhanced block or wall or drywall sheet include 110 parts sand or less.

According to various exemplary embodiments of the invention, the block or wall or drywall sheet includes 135 parts, 130 parts, 125 parts, 120 parts, 115 parts, 110 parts, 105 parts or 100 parts or intermediate or lesser numbers of parts of sand. In some embodiments, a reduction in the number of parts of sand contributes to a reduction in concrete strength.

Some embodiments of the plant enhanced block or wall or drywall sheet include 70.1 parts plant material. According to various exemplary embodiments of the invention, the block or wall or drywall sheet includes 50 parts, 55 parts, 60 parts, 65 parts, 70 parts, 75 parts, 80 parts or intermediate or lesser number of parts of plant material.

In some embodiments of the plant enhanced block or wall or drywall sheet the plant material has an average length of 1-2 mm.

In some embodiments, the plant enhanced block or wall or drywall sheet includes less than 189.3 parts cement. According to various exemplary embodiments of the invention, the plant enhanced block or wall or drywall sheet includes 225 parts, 220 parts, 210 parts, 205 parts, 200 parts, 195 parts, 190 parts, 185 parts or 180 parts or intermediate or lesser numbers of parts cement.

In some embodiments, the plant enhanced block or wall or drywall sheet includes less than 67.5 parts sodium silicate. According to various exemplary embodiments of the invention, the plant enhanced block or wall or drywall sheet includes 75 parts, 72 parts, 70 parts, 68 parts, 66 parts, 64 parts, 62 parts, 60 parts or 58 parts or intermediate or lesser numbers of parts sodium silicate.

Second Exemplary Block or Wall or Sheet

In some exemplary embodiments of the invention there is provided a plant enhanced block or wall or drywall sheet comprising (W/W): at least 126.3 parts plant material sealed with sodium silicate (water glass);
not more than 67.7 parts gravel; and not more than 168 parts cement. In some embodiments of the plant enhanced block or wall or drywall sheet, the plant material includes Kenaf derived material. In some embodiments, the Kenaf derived material includes Kenaf core material.

In some embodiments, the plant enhanced block or wall or drywall sheet has a specific gravity of 720-790 Kg/m$^3$.

In some embodiments, the plant enhanced block or wall or drywall sheet includes 67.8 parts gravel or less. According to various exemplary embodiments of the invention, the plant enhanced block or wall or drywall sheet includes 90 parts, 85 parts, 80 parts, 120 parts, 75 parts, 70 parts, 65 parts or 60 parts or intermediate or lesser numbers of parts of gravel. In some embodiments, a reduction in the number of parts of gravel contributes to a reduction in concrete strength.

In some embodiments, the plant enhanced block or wall or drywall sheet includes less than 168 parts cement. According to various exemplary embodiments of the invention, the plant enhanced block or wall or drywall includes 225 parts, 220 parts, 210 parts, 205 parts, 200 parts, 195 parts, 190 parts, 185 parts, 180 parts, 175 parts, 170 parts or 165 parts or intermediate or lesser numbers of parts cement.

In some embodiments, the plant enhanced block or wall or drywall sheet includes less than 61.8 parts sodium silicate. According to various exemplary embodiments of the invention, the plant enhanced block or wall or drywall sheet includes 75 parts, 72 parts, 70 parts, 68 parts, 66 parts, 64 parts, 62 parts, 60 parts or 58 parts or intermediate or lesser numbers of parts sodium silicate.

Exemplary Plaster Sheet (Drywall)

In some exemplary embodiments of the invention there is provided plant enhanced plaster sheet (drywall) comprising (W/W): at least 7.4 parts plant fiber and at least 264.1 parts Kenaf powder); not more than 389.6 parts sand; and not more than 1139.3 parts cement.

Drywall is prepared by making a paste with water, pressing into sheets and drying.

In some embodiments of the plant enhanced plaster sheet, a ratio of water glass to Kenaf based plant material is between 0.5 and 10.

Alternatively or additionally, in some embodiments the plant enhanced plaster sheet includes 200 parts sand or less.

Alternatively or additionally, in some embodiments the plant enhanced plaster sheet includes at least 264.1 parts Kenaf powder. According to various exemplary embodiments of the invention, the plant enhanced plaster sheet includes 250 parts, 275 parts, 300 parts, 310 parts, 320 parts, 330 parts, 340 parts or 350 parts or intermediate or greater numbers of parts Kenaf powder.

Alternatively or additionally, in some embodiments of the plant enhanced plaster sheet, the plant fiber includes Kenaf fiber. According to various exemplary embodiments of the invention, the sheet includes 6 parts, 8 parts, 10 parts, 12 parts, 14 parts, 16 parts, 18 parts or 20 parts or intermediate or lesser numbers of parts Kenaf fiber.

Alternatively or additionally, some embodiments of the plant enhanced plaster sheet include less than 1139.3 parts cement. According to various exemplary embodiments of the invention, the plaster sheet includes 1000 parts, 1200 parts, 1300 parts, 1400 parts, 1500 parts, 1600 parts, 1700 parts or 1800 parts or intermediate or lesser numbers of parts of cement.

Alternatively or additionally, some embodiments of the plant enhanced plaster sheet have a compressive strength of at least 6 Mpa.

Alternatively or additionally, some embodiments of the plant enhanced plaster sheet have a thermal conductivity of at most 0.12 W/m*K.

Exemplary Kenaf Derived Material for Inclusion in a Dry Mix for Concrete

In some exemplary embodiments of the invention there is provided a composition including: powder milled from Kenaf core plus bast with D90=220 µm and D50=75 µm-90 µm. In some embodiments, the powder has a core:bast ratio equal to fully matured Kenaf (about 3:2). In some exemplary embodiments of the invention, the composition includes water glass (sodium silicate). In some embodiments, the water glass seals a surface of at least some particles of the powder. According to various exemplary embodiments of the invention sealing with water glass was determined by trial and error, According to various exemplary embodiments of the invention the sealing with NA silicate is adjusted for different sources of Kenaf, different milling morphology, different milled size and other parameters. The test of sealing efficiency is compressive strength over cubes.

PSD was determined using sieves and an automated vibration machine with interval mode of 10 seconds each vibration interval. Vibration was continued for 10 minutes for each batch we put on the sieves, until full testing of 500 gr raw material was sieved and analyzed.

Additional Exemplary Masonry Block:

In some exemplary embodiments of the invention there is provided, a masonry block comprising at most 60% plant material and having a compressive strength of at least 8 MPa. In some exemplary embodiments of the invention, the plant material comprises Kenaf derived material. In some exemplary embodiments of the invention, the Kenaf derived material includes Kenaf core. According to various exemplary embodiments of the invention, the Kenaf derived material includes powder milled from Kenaf core plus bast with D90=220 μm and D50=75 μm-90 μm and/or having a core:bast ratio equal to fully matured Kenaf (about 3:2). Alternatively or additionally, in some embodiments the block includes at least 40% cement. Alternatively or additionally, in some embodiments the block has a water/cement ratio of not more than 0.38.

The principles and operation of a materials and/or methods according to exemplary embodiments of the invention may be better understood with reference to the drawings and accompanying descriptions.

Before explaining at least one embodiment of the invention in detail, it is to be understood that the invention is not limited in its application to the details set forth in the following description or exemplified by the Examples. The invention is capable of other embodiments or of being practiced or carried out in various ways. Also, it is to be understood that the phraseology and terminology employed herein is for the purpose of description and should not be regarded as limiting.

It is expected that during the life of this patent many Kenaf based products will be developed and the scope of the invention is intended to include all such new technologies a priori.

As used herein the term "about" refers to ±10%.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

Specifically, a variety of numerical indicators have been utilized. It should be understood that these numerical indicators could vary even further based upon a variety of engineering principles, materials, intended use and designs incorporated into the various embodiments of the invention. Additionally, components and/or actions ascribed to exemplary embodiments of the invention and depicted as a single unit may be divided into subunits. Conversely, components and/or actions ascribed to exemplary embodiments of the invention and depicted as sub-units/individual actions may be combined into a single unit/action with the described/depicted function.

Alternatively, or additionally, features used to describe a method can be used to characterize an apparatus and features used to describe an apparatus can be used to characterize a method.

It should be further understood that the individual features described hereinabove can be combined in all possible combinations and sub-combinations to produce additional embodiments of the invention. The examples given above are exemplary in nature and are not intended to limit the scope of the invention which is defined solely by the following claims.

Each recitation of an embodiment of the invention that includes a specific feature, part, component, module or process is an explicit statement that additional embodiments of the invention not including the recited feature, part, component, module or process exist.

Alternatively or additionally, various exemplary embodiments of the invention exclude any specific feature, part, component, module, process or element which is not specifically disclosed herein.

Specifically, the invention has been described in the context of Kenaf derived materials but might also be used to incorporate material from other plants into cement based mixtures.

All publications, references, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

The terms "include", and "have" and their conjugates as used herein mean "including but not necessarily limited to".

Additional objects, advantages, and novel features of various embodiments of the invention will become apparent to one ordinarily skilled in the art upon examination of the following examples, which are not intended to be limiting. Additionally, each of the various embodiments and aspects of the present invention as delineated hereinabove and as claimed in the claims section below finds experimental support in the following examples.

EXAMPLES

Reference is now made to the following examples, which together with the above descriptions, illustrate the invention in a non-limiting fashion.

Example 1

Particle Size Distribution (PSD) and Mixes Based on PSD Criteria

In order to determine the effect of various types of Kenaf derived plant material on concrete properties, three type of Kenaf derived material were tested:
coarse particles of 1-4 mm
powder from core of 0-0.3 mm
powder from entire stem of 0-0.85 mm In order to add strength to the mix other natural aggregates were used according to the desired theoretical optimal PSD.

Two natural aggregates were tested: silica sand of 0-0.3 mm and limestone gravel of 2-6 mm.

The desired theoretical optimal psd was based on the packing theory of fuller and others (see H. J. H. Brouwers and H. J. Radix, "Self-Compacting Concrete: Theoretical and experimental study", Cement and Concrete Research 35 (2005) 2116-2136) using q value of 0.5 for upper limit and q value of 1.4 for lower limit.

The main purpose of the research was to create highly thermal resistant mixtures based on Kenaf. In some embodiments, optimization of closed pack distribution of Kenaf core particles (Kenaf coarse particles of 1-4 mm and Kenaf powder from core of 0-0.3 mm) contributes to an increase in the thermal resistance.

Figure 3:
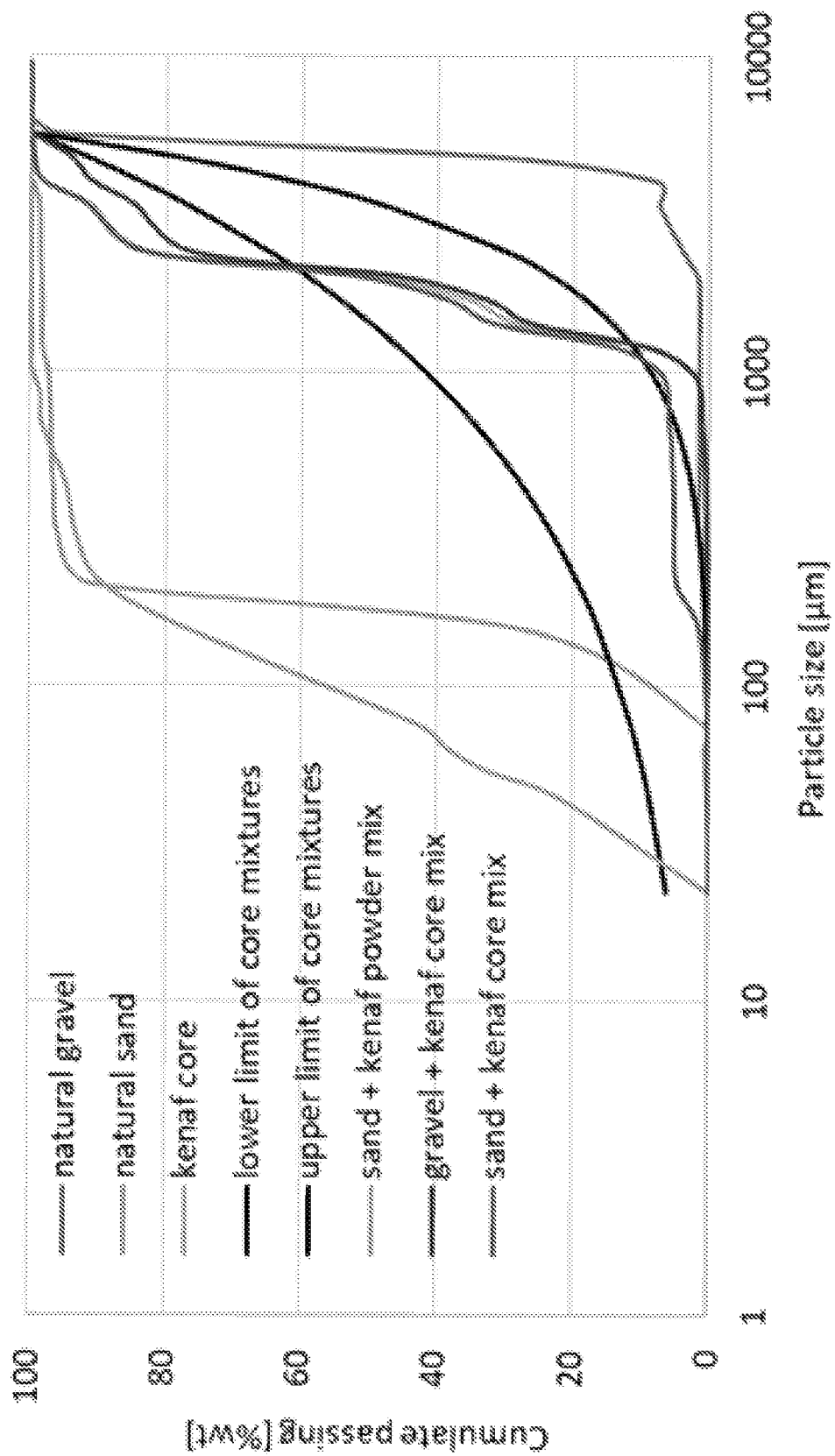
FIG. 3 is a graph of cumulative passing weight percentage as a function of particle size for mixtures according to some exemplary embodiments of the invention.

Results are presented in table 1a; table 1b and FIG. 3.

Table 1b presents an example of the particle size distribution of natural quartz sand. Similar methodology was employed for all other raw materials. Taking the particle size distribution (psd) of each raw material separately and combining them into mixtures that aim to be as close as possible to the theoretical preferred psd range, produced the mixtures of table 1a and graph 1. None of the mixtures is optimal because the product development could be based only on commercially available raw materials. An optimal mixture can be made based on materials processing to receive the most suitable psd or if other more suitable raw materials can be found commercially. It is believed that psd improvement will contribute to strength and thermal insulation properties of the mixture. Although the aggregate content (sand and/or gravel) in the mixture is low its contribution to the mixture strength is possibly more important than that of Kenaf derived material. Alternatively or additionally, any compromise over the Kenaf content to lower values will have significant negative influence over the thermal insulation of the mix (i.e. the thermal conductivity of the mix will be higher than the one achieved).

FIG. 3 illustrates the upper and lower limits of the preferred PSD to this case of Kenaf particles (the area between those limits is highlighted in turquoise), having along its side few PSD's of raw materials and mixtures. The mixtures were designed in such a way that it best fit to the desired PSD limits.

This example illustrates that in order to achieve best thermal performance (low thermal conductivity) the Kenaf mixture should behave in accordance with specific limits of PSD. Moreover, the PSD defines also the best mixture in terms of strength, although for this property there could be also limitation to the total quantity of the sand/gravel which is both from mechanical point of view and from optimizing the thermal performance of the mixture point of view.

TABLE 1A mixtures prepared based on PSD that correspond to limits that were found to be optimal for such type of aggregates and mixtures.

|  | Volume percentage in mix 1 | Volume percentage in mix 2 | Volume percentage in mix 3 |
| --- | --- | --- | --- |
| natural quartz sand | 0 | 0.05 | 0.07 |
| natural limestone gravel (sumsum) | 0.08 | 0 | 0 |
| Kenaf core | 0.92 | 0.95 | 0.93 |

| particle size [μm] | gravel + Kenaf core mix [%] | sand + Kenaf core mix [%] | sand + Kenaf powder mix [%] | lower limit for Kenaf core mixtures [%] | upper limit for Kenaf core mixtures [%] |
| --- | --- | --- | --- | --- | --- |
| 9500 | 100.0 | 100.0 | 100.0 |  |  |
| 6350 | 100.0 | 100.0 | 100.0 |  |  |
| 5660 | 99.7 | 100.0 | 100.0 | 100.0 | 100.0 |
| 4760 | 93.9 | 99.5 | 100.0 | 78.5 | 91.7 |
| 4000 | 91.0 | 98.3 | 100.0 | 61.5 | 84.1 |
| 3360 | 84.6 | 91.7 | 99.9 | 48.2 | 77.0 |
| 2380 | 76.2 | 83.3 | 99.9 | 29.7 | 64.8 |
| 2000 | 46.1 | 52.4 | 99.9 | 23.3 | 59.4 |

TABLE 1A-continued mixtures prepared based on PSD that correspond to limits that were found to be optimal for such type of aggregates and mixtures.

| 1680 | 32.7 | 38.6 | 99.9 | 18.3 | 54.5 |
| --- | --- | --- | --- | --- | --- |
| 1410 | 26.0 | 31.7 | 99.9 | 14.3 | 49.9 |
| 1190 | 8.9 | 14.0 | 99.8 | 11.3 | 45.9 |
| 1000 | 2.7 | 7.6 | 99.7 | 8.8 | 42.0 |
| 841 | 1.3 | 6.1 | 98.6 | 6.9 | 38.5 |
| 707 | 1.3 | 6.1 | 98.5 | 5.4 | 35.3 |
| 600 | 0.9 | 5.6 | 97.4 | 4.3 | 32.6 |
| 500 | 0.7 | 5.4 | 95.8 | 3.3 | 29.7 |
| 420 | 0.5 | 5.3 | 94.5 | 2.6 | 27.2 |
| 300 | 0.5 | 5.1 | 93.2 | 1.6 | 23.0 |
| 210 | 0.2 | 4.8 | 89.4 | 1.0 | 19.3 |
| 150 | 0.1 | 1.5 | 76.6 | 0.6 | 16.3 |
| 75 | 0.0 | 0.1 | 42.8 | 0.2 | 11.5 |
| 63 | 0.0 | 0.0 | 38.5 | 0.2 | 10.6 |
| 53 | 0.0 | 0.0 | 32.3 | 0.1 | 9.7 |
| 44 | 0.0 | 0.0 | 22.2 | 0.1 | 8.8 |
| 22 | 0.0 | 0.0 | 0.0 | 0.0 | 6.2 |

TABLE 1B example of particle size distribution received for the natural quartz sand.

natural quartz sand psd

| raw test results | | | processed results | | |
| --- | --- | --- | --- | --- | --- |
| | | | Differential | Cumulative | Cumulative |
| Mass [grams] | Size in mm | Size in microns | remaining percentage | remaining percentage | passing percentage |
| 1.3 | 4 | 4000 | 0.2 | 0.2 | 99.8 |
| 6.8 | 3.36 | 3360 | 1.1 | 1.3 | 98.7 |
| 1 | 2.38 | 2380 | 0.2 | 1.4 | 98.6 |
| 1 | 2 | 2000 | 0.2 | 1.6 | 98.4 |
| 1 | 1.68 | 1680 | 0.2 | 1.7 | 98.3 |
| 0 | 1.19 | 1190 | 0.0 | 1.7 | 98.3 |
| 5.5 | 1 | 1000 | 0.9 | 2.6 | 97.4 |
| 1.6 | 0.841 | 841 | 0.2 | 2.8 | 97.2 |
| 1.3 | 0.707 | 707 | 0.2 | 3.0 | 97.0 |
| 0.6 | 0.5 | 500 | 0.1 | 3.1 | 96.9 |
| 2.1 | 0.42 | 420 | 0.3 | 3.4 | 96.6 |
| 3.9 | 0.3 | 300 | 0.6 | 4.0 | 96.0 |
| 30.1 | 0.21 | 210 | 4.7 | 8.7 | 91.3 |
| 414.8 | 0.15 | 150 | 64.2 | 72.9 | 27.1 |
| 170.2 | 0.075 | 75 | 26.3 | 99.2 | 0.8 |
| 0 | 0.063 | 63 | 0.0 | 99.2 | 0.8 |
| 1.2 | 0.053 | 53 | 0.2 | 99.4 | 0.6 |
| 1.7 | 0.044 | 44 | 0.3 | 99.7 | 0.3 |
| 2.2 | 0.022 | 22 | 0.3 | 100.0 | 0.0 |

Example 2

Testing Kenaf Raw Material Influence Over Cement Based Mixtures

In order to test the influence of Kenaf flakes quantity on the workability of a cement-Kenaf mixture, a series of mixtures with different percentages of Kenaf and cement were prepared. The mixtures where prepared in such a way that there is only cement and Kenaf to create the final product; while the water content was changed according to the slump of the mixture in such a way that similar slump was achieved, slump criteria corresponded to Israeli standard 1920 part 1 (testing methodology by ASTM C 109M). All mixtures were based on dry mixing of the Kenaf (as received by the supplier) with the cement, prior to the addition of the water to the mix.

Results are summarized in graph 2, which clearly shows the influence of the large water absorption of the Kenaf (as received by the supplier) by means of increased water/cement ratio in order to maintain the same workability. In graph 2, the X axis is cement content in volume percentage and the Y axis is the water/cement ratio.

The more Kenaf in the mixture the more water is needed to get a proper workability mixture. Eventually, the target content of 90% Kenaf (defined initially for this research as the upper content limit possible, that will provide best thermal performance) requires water/cement ratio of 0.9, which accordingly to cement chemistry will produce very low strength mixture (in this case 0 MPa). Moreover, the Kenaf itself is weak under compression forces, and even a mixture with water/cement ratio of 0.44 produced only 0.7 MPa strength at day 28. In light of these results reduction of Kenaf water absorption became a research goal, based on the supposition that a reduction in water absorption by Kenaf will contribute to the matrix strength (can utilize low water/cement ratio).

Figure 4:
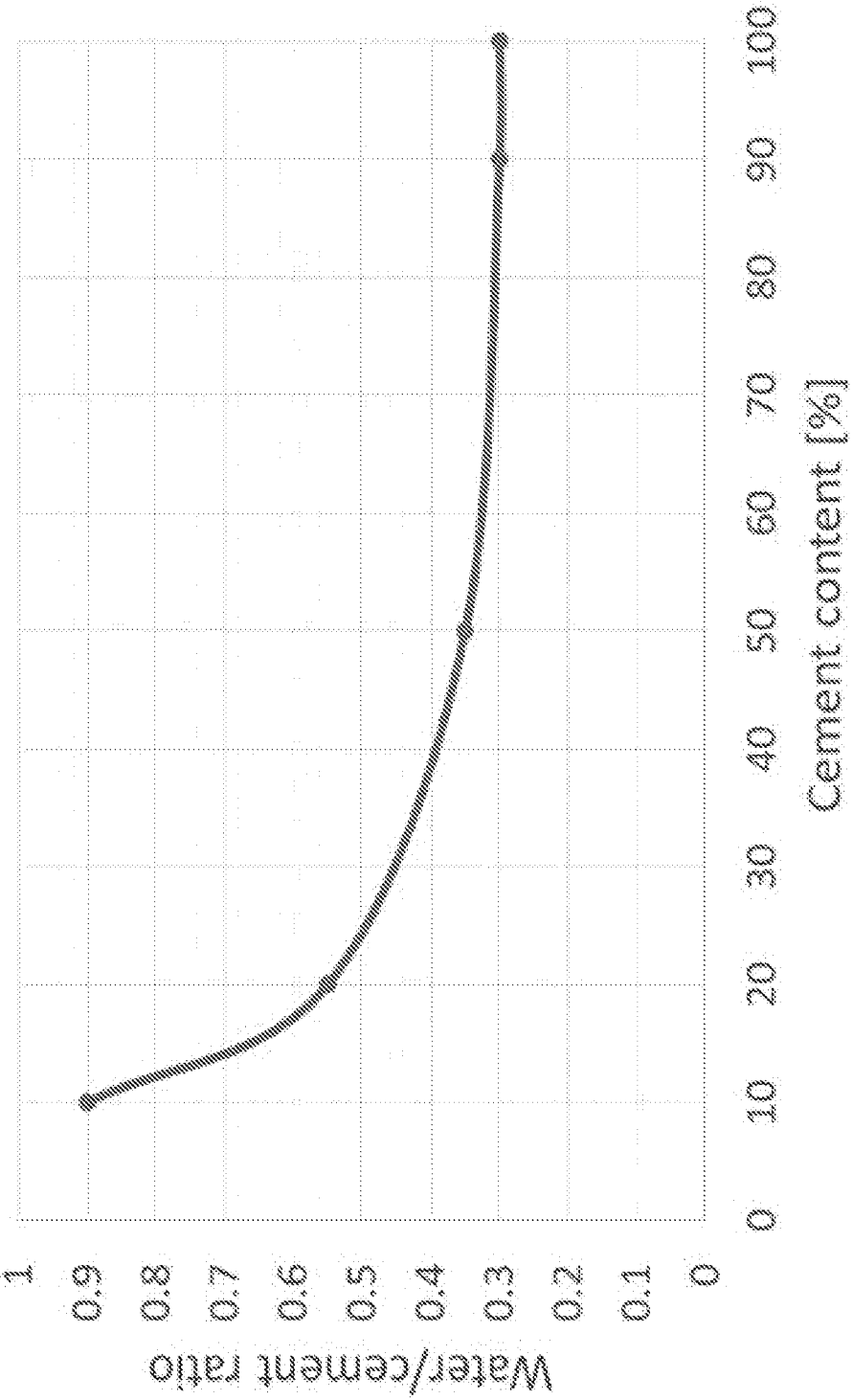
FIG. 4 is a graph of water/cement ratio as a function of cement content according to some exemplary embodiments of the invention.

Results presented in FIG. 4 indicate that higher cement content in the mixture impose higher water content needed, i.e., the water/cement ratio vs. the cement content behave exponentially decay. In FIG. 4 Cement-Kenaf core-water mixtures, having similar slump criteria, where Cement+Kenaf count as 100%, e.g., 20% cement mixture has 80% Kenaf. Percentages in volume.

This example illustrates that, for example 0% Kenaf and 100% cement (volumetric percentage) which is the lowest y axis point on the graph, and 90% Kenaf and 10% cement which is the highest y axis point on the graph, both have the same workability but the water/cement ratio is different.

This finding is important because as the water/cement ratio increases the strength decreases. It is therefore important to know the behavior of water/cement change due to different amount of Kenaf in the mixture.

In contrast to FIG. 3. presented in Example 1, FIG. 4 is a tool for development only which has significance when considering Kenaf quantity range for actual formulations in consideration of water/cement values, mainly to understand the importance of surface treatment to reduce the Kenaf water absorption.

Example 3

Initial Mixtures Tested to Understand The Influences of Different Materials in the Mix In order to understand the influence of the raw materials (as received by the supplier) different mixtures where constructed and tested. Those initial mixtures were the basis for the research work, where the initial mixtures results served as the content starting point for improvement. All mixtures were based on dry mixing of the dry ingredients followed by water addition to get the same workability. Those mixtures were done accordingly to the research methodology of the researchers.

The approach used was testing each of the Kenaf raw materials and understand its influence over the mixture strength, then create combinations of Kenaf raw materials to create preferred PSD and its influence over the mixture strength, followed by the attempt to increase Kenaf content and reduce cement content.

Table 2 is a list of recipes for concrete mixtures supplemented with Kenaf material. FIGS. 9-15 illustrate graphically results from mixtures in table 2.

TABLE 2

Component rations in plaster mixtures

| Cement (grams) | Kenaf core (grams) | Kenaf powder (grams) | Water (grams) | Kenaf fiber (grams) | Water:cement ratio |
|---|---|---|---|---|---|
| 5139.9 | 0.0 | 0.0 | 1542.0 | 0.0 | 0.3 |
| 4860.1 | 24.4 | 0.0 | 1458.0 | 0.0 | 0.3 |
| 4550.5 | 51.4 | 0.0 | 1365.1 | 0.0 | 0.3 |
| 4151.4 | 80.3 | 0.0 | 1286.9 | 0.0 | 0.31 |
| 3688.2 | 111.0 | 0.0 | 1217.1 | 0.0 | 0.33 |
| 3215.6 | 145.2 | 0.0 | 1125.4 | 0.0 | 0.35 |
| 2697.1 | 182.7 | 0.0 | 1024.9 | 0.0 | 0.38 |
| 2111.8 | 222.5 | 0.0 | 929.2 | 0.0 | 0.44 |
| 1479.5 | 267.3 | 0.0 | 813.7 | 0.0 | 0.55 |
| 775.6 | 315.2 | 0.0 | 698.0 | 0.0 | 0.9 |
| 5139.9 | 0.0 | 0.0 | 1542.0 | 0.0 | 0.3 |
| 4860.1 | 0.0 | 24.4 | 1458.0 | 0.0 | 0.3 |
| 4550.5 | 0.0 | 51.4 | 1365.1 | 0.0 | 0.3 |
| 4151.4 | 0.0 | 80.3 | 1286.9 | 0.0 | 0.31 |
| 3688.2 | 0.0 | 111.0 | 1217.1 | 0.0 | 0.33 |
| 3215.6 | 0.0 | 145.2 | 1125.4 | 0.0 | 0.35 |
| 2697.1 | 0.0 | 182.7 | 1024.9 | 0.0 | 0.38 |
| 2111.8 | 0.0 | 222.5 | 929.2 | 0.0 | 0.44 |
| 1479.5 | 0.0 | 267.3 | 813.7 | 0.0 | 0.55 |
| 775.6 | 0.0 | 315.2 | 698.0 | 0.0 | 0.9 |
| 3061.7 | 135.5 | 0.0 | 1377.8 | 3.0 | 0.45 |
| 3061.7 | 132.7 | 0.0 | 1377.8 | 5.9 | 0.45 |
| 3061.7 | 130.0 | 0.0 | 1377.8 | 8.9 | 0.45 |
| 3061.7 | 127.2 | 0.0 | 1377.8 | 11.9 | 0.45 |
| 3061.7 | 124.4 | 0.0 | 1377.8 | 14.8 | 0.45 |
| 3061.7 | 91.3 | 47.0 | 1377.8 | 0.0 | 0.45 |
| 3023.6 | 92.0 | 47.4 | 1360.6 | 3.0 | 0.45 |
| 2985.0 | 92.7 | 47.7 | 1343.2 | 6.0 | 0.45 |
| 2945.7 | 93.4 | 48.1 | 1325.5 | 9.1 | 0.45 |
| 2905.8 | 94.1 | 48.5 | 1307.6 | 12.2 | 0.45 |
| 2865.2 | 94.9 | 48.9 | 1289.3 | 15.4 | 0.45 |
| 2061.4 | 0.0 | 224.7 | 907.0 | 3.4 | 0.44 |
| 2010.0 | 0.0 | 226.9 | 884.4 | 6.9 | 0.44 |
| 1957.5 | 0.0 | 229.2 | 861.3 | 10.5 | 0.44 |
| 1423.6 | 0.0 | 270.7 | 783.0 | 3.6 | 0.55 |
| 1366.3 | 0.0 | 274.2 | 751.5 | 7.3 | 0.55 |
| 1307.4 | 0.0 | 277.9 | 719.1 | 11.2 | 0.55 |
| 775.6 | 311.7 | 0.0 | 698.0 | 3.8 | 0.9 |
| 775.6 | 308.2 | 0.0 | 698.0 | 7.5 | 0.9 |
| 775.6 | 304.7 | 0.0 | 698.0 | 11.3 | 0.9 |
| 1650.1 | 0.0 | 242.4 | 726.1 | 3.7 | 0.44 |
| 1605.8 | 0.0 | 244.4 | 706.5 | 7.5 | 0.44 |
| 1560.7 | 0.0 | 246.3 | 686.7 | 11.3 | 0.44 |

Example 4

Final mixtures after the entire development process After much trial and error using Kenaf only mixtures characterized by the full PSD made with Kenaf produced poor results (not enough cement to cover all the Kenaf) work progressed to Kenaf surface treatment. Several silicon based solutions were tested so that the chemistry with the cement would improve. Water glass was finally selected and several application approaches of pre-treatment were evaluated. Numerous matrix combinations were evaluated and gypsum and lime were ruled out because they didn't respond well to the Kenaf. Gray cement was chosen over white cement based on superior performance. Different applications of the mixtures what comes when and for how long were assayed. In addition, different ways to cast the mixtures and harden product were evaluated. Then natural aggregates were added to increase strength. Finally, fine tuning of the mixtures based on strength, thermal conductivity and consistency was conducted.

Table 3a show the final mixtures content and table 3b shows the weight per volume results of those final mixtures. 10SNC8 and 10GNC5 were prepared as follows:

1. Mixing all the Kenaf core with all the water glass up until the Kenaf absorbs all the water and the mixture become as coated Kenaf particles with no agglomerates. This process needed 5 minutes in the lab scale, but it can be different when using different mixers and larger batches. The mixer used had Aluminum flat beater and was used with medium to high mixing speeds to get proper breakage of agglomerates and best coating results. It was found important that no over mixing should be applied because it harms the coating.
2. All dry components where added to the dry coated Kenaf core and were mixed for 2-3 minutes (with one stop for hand mix) until homogenous mix was received.
3. All water was added to the dry mixture and the entire mixture was mixed for 10 minutes (with two stopes for hand mixing), until homogenous mixture received with proper consistency.

The casting method used is pouring the mixture to plastic mold, having three 10/10/10 cm cubes in each mold, and by using a proper upper assembly to press the mixture into the mold. During the pressing, and only when pressure applied, a vibration was applied using vibrating table. The pressing was done manually by hand with medium force of the operator.

35PFP6 was prepared by mixing all dry ingredients in a mixer to make a uniform mixture (about 5-10 minute mixing), followed by adding the water to prepare and mix the final mortar. Casting was in 2.5/2.5/2.5 cm molds.

TABLE 3a

Exemplary Formulations

| name | type | Cement (gram) | Kenaf core (gram) | Kenaf powder (gram) | Fiber (gram) | Natural sand (gram) | Na-silicate (water glass) (gram) | Gravel (sum Sum) (gram) | Water (gram) |
|---|---|---|---|---|---|---|---|---|---|
| 10SNC8 | Block | 775 | 287 | — | — | 500 | 276.5 | — | 750 |
| 10GNC5 | Block | 775 | 297.5 | — | — | — | 285.25 | 312.5 | 750 |
| 35PFP6 | Plaster | 1139.25 | — | 264.11 | 7.35 | 389.55 | — | — | 1350 |

TABLE 3b

Properties of Exemplary Formulations

| name | number | Weight (grams) | Edge length (mm) |
|---|---|---|---|
| 10SNC8 | Block 1 | 270.7 | 70 |
|  | Block 2 | 262.3 | 70 |
|  | Block 3 | 247.1 | 70 |
|  | Block 4 | 779.3 | 100 |
|  | Block 5 | 594.7 | 100.65 |
| 10GNC5 | Block 1 | 661.3 | 99.7 |
|  | Block 2 | 693.3 | 97.52 |
|  | Block 3 | 645.8 | 99.8 |
| 35PFP6 | Plaster 1 | 13.1 | 23.12 |
|  | Plaster 2 | 12.9 | 23.85 |
|  | Plaster 3 | 12.6 | 23.8 |
|  | Plaster 4 | 12.9 | 24.54 |
|  | Plaster 5 | 12.6 | 23.17 |
|  | Plaster 6 | 13.2 | 24.13 |

Tables 3a and 3b show final exemplary mixtures according to some embodiments of the invention and some of their final results.

Example 5: Adding Sand

Adding Sand to the Mixture

In order to improve mixture strength, either sand or gravel were added, first based on preferred PSD before optimizing content based on tests.

Results presented in tables 4a and 4b illustrate mixtures tested with and without Kenaf fibers to see its influence over the strength.

TABLE 4a

Exemplary Formulations

| formula | Water (gram) | Kenaf core (gram) | Sand (gram) | Gray cement (gram) | Fiber (gram) | Added water (gram) |
|---|---|---|---|---|---|---|
| 38 | 698 | 283.7 | 585.4 | 775.6 | — | 250 |
| 10 | 698 | 277.4 | 572.4 | 775.6 | 7.5 | 270 |

TABLE 4b

Exemplary Block Characteristics

| formula | Block | Weight (grams) | Length cm | Width cm | Strength Kgf |
|---|---|---|---|---|---|
| 38 | 1 | 693 | 10.1 | 9.7 | 1350 |
|  | 2 | 707.6 | 10.1 | 10.3 | 1510 |
|  | 3 | 711.1 | 9.9 | 10.1 | 1050 |
|  | Avg. | 703.9 | 10.0 | 10.0 | 1303 |

TABLE 4b-continued

Exemplary Block Characteristics

| formula | Block | Weight (grams) | Length cm | Width cm | Strength Kgf |
|---|---|---|---|---|---|
| 10 | 1 | 654.2 | 9.8 | 10.4 | 985 |
|  | 2 | 698 | 10.3 | 10.2 | 1020 |
|  | 3 | 693.7 | 10.1 | 9.9 | 880 |
|  | Avg. | 682 | 10.1 | 10.2 | 961.7 |

Example 6: Large Aggregate

Adding Gravel to the Mixture

In order to improve mixture strength, either sand or gravel were added, first based on preferred PSD before optimizing content based on tests. Since the strength was insufficient, and based on the common knowledge that aggregates are the main ingredient in concrete that controls the strength, some of the Kenaf was replaced with natural strong aggregates.

Quartz sand was used initially because it is the strongest ingredient but initial tests were disappointing so limestone gravel was also used. The idea is to bring more strength by filling up voids in the mixture and by creating sub-structure of natural aggregates that transfer loads from one to another and give strength. The last consideration is that natural aggregates have good bonding to the cement and thus when crack move through the cement matrix (being the weakest constituent) it halts at contact with the aggregate and it is hard for it to bypass the aggregate through a strong bond layer, this also why just small amount of natural aggregates makes a relatively large difference.

Results presented in table 5 suggest that mixtures without fibers worked better and that the best combination and amount of natural aggregates should be sought instead of trying to reinforce with fibers.

TABLE 5

Exemplary replacement of some of the Kenaf flakes by coarse limestone aggregate.

| Formula | Block | Weight (grams) | Length cm | Width? cm | Result of green press Force [tons] |
|---|---|---|---|---|---|
| 10 | 1 | 1272.54 | 10.1 | 10.2 | 2 |
|  | 2 | 1560.8 | 10.3 | 10.4 | 4 |
|  | 3 | 1575.38 | 10.1 | 10.2 | 1.5 |
|  | Avg. | 1469.6 | 10.2 | 10.3 | 2.5 |
| 38 | 1 | 1725.61 | 10.4 | 10.2 | 2 |
|  | 2 | 1166.3 | 10.3 | 10.4 | 2 |
|  | 3 | 1356.3 | 10.3 | 10.4 | 1 |
|  | Avg. | 1416.1 | 10.3 | 10.3 | 1.7 |

Example 7: New Plaster Formations

Optimizing Sand Content in the Plaster

In order to determine the right amount of sand to add to the mixture based on strength criteria, mixtures were made, without Kenaf, with Kenaf powder and fibres, and with/without the addition of water glass. The mixtures with the Kenaf were based on the same methodology described in Example 4. Results presented in Table 6a show mixtures prepared. Tables 6b, 6c and 6d shows their results after 28 days curing.

In general the plaster mixture was based on mixture #35, this is a mixture having 80% vol. Kenaf powder (made from full bark), 18% vol. cement CEM II B-LL 42.5, 2% vol. Kenaf fibers. Mixture #35 was found to be the threshold limit of Kenaf that we can put in the mixture, we couldn't get good results with this mixture, compared to other mixtures with lower Kenaf content, so this became the target amount that we strived for.

Mixture (#33) with 70% vol. Kenaf powder and 28% vol. cement gave compressive strength of 4 MPa, not far from the value needed. But it is high percentage of cement and we wanted to reduce it to around 15% vol.

Mixture #19 which is similar to #35 but without Kenaf fibers and 20% vol. cement gave 0.3 MPa, so we understood we will probably won't go down below 20% vol. cement.

When we added the Kenaf fibers we got mixture #35 with compressive strength of 0.7 MPa, still very far from what is needed, but this how we decided to continue with 2% vol. Kenaf fibers. Then we add 8% vol. quartz sand and reduced all other constituents with the same ratio, we immediately got about 12 MPa of compressive strength. So we understood we can reduce further the amount of cement to get what we want and we decided to produce mixtures with 15% vol. cement that we defined theoretically to be most economically and effective. The mixtures of 'WG' were tested because we showed before that other surface treatments were not successful while water glass improved strength. Mixtures 'PP' were tested to see if we can take out the Kenaf fibers. Mixtures 'PFP' were based on the true #35 having 2% vol. Kenaf fibers and without water glass. The best result for the WG mixtures was 35WG6, having compressive strength of 4 MPa. The best result for the PP mixtures was 35PP6, having compressive strength of 4.9 MPa. The best result for the PFP mixtures was 35PFP6, having compressive strength of 6 MPa. The following points became apparent:

1. The best amount of sand was 6% vol. with all three approaches.
2. The addition of water glass was the worse of the three, which was different trend from what we saw for the Kenaf flakes, so we didn't continue with the water glass to plasters.
3. Fibers are essentials, so the 2% vol. Kenaf fibers are a must, although it makes the product more expensive.
4. With smart combination of the sand to mix #35, we could reduce further the cement amount from 18% to 15%, but we also reduced the Kenaf powder from 80% to 77%, we didn't touch the amount of fibers so compared to #35 we had actually higher fiber ratio, and we added only 6% sand and this gave us a product (plaster having larger compressive strength than 5 MPa).

We had some more fine tuning of the water ratio, just to reduce drying shrinkage, but it didn't affect the final strength.

This is in short the story of the plaster. You can also understand from this short story that all ingredients are essential in their presence and amount.

This example illustrates that the optimal content of sand in the plaster is 6%.

TABLE 6a

Exemplary Plaster formulations

| Formula | Water (grams) | Natural Sand (grams) | Kenaf fibers (grams) | Kenaf Powder (grams) | Gray Cement (grams) | Water Glass (grams) |
|---|---|---|---|---|---|---|
| 35WG8 | 991.14 | 389.55 | 7.35 | 264.11 | 1139.25 | 264.6 |
| 35WG7 | 991.14 | 389.55 | 7.35 | 264.11 | 1139.25 | 231.525 |
| 35WG6 | 991.14 | 389.55 | 7.35 | 264.11 | 1139.25 | 198.45 |
| 35WG5 | 991.14 | 389.55 | 7.35 | 264.11 | 1139.25 | 165.375 |
| 35WG4 | 991.14 | 389.55 | 7.35 | 264.11 | 1139.25 | 132.3 |
| 35WG3 | 991.14 | 389.55 | 7.35 | 264.11 | 1139.25 | 99.225 |
| 35PFP10 | 991.14 | 649.25 | 7.35 | 250.39 | 1139.25 | 0 |
| 35PFP8 | 991.14 | 519.4 | 7.35 | 257.25 | 1139.25 | 0 |
| 35PFP6 | 991.14 | 389.55 | 7.35 | 264.11 | 1139.25 | 0 |
| 35PFP4 | 991.14 | 259.7 | 7.35 | 270.97 | 1139.25 | 0 |
| 35PFP2 | 991.14 | 129.85 | 7.35 | 277.83 | 1139.25 | 0 |
| 35PFP0 | 991.14 | 0 | 7.35 | 284.69 | 1139.25 | 0 |
| 35PP10 | 991.14 | 649.25 | 0 | 257.25 | 1139.25 | 0 |
| 35PP8 | 991.14 | 519.4 | 0 | 264.11 | 1139.25 | 0 |
| 35PP6 | 991.14 | 389.55 | 0 | 270.97 | 1139.25 | 0 |
| 35PP4 | 991.14 | 259.7 | 0 | 277.83 | 1139.25 | 0 |
| 35PP2 | 991.14 | 129.85 | 0 | 284.69 | 1139.25 | 0 |
| 35PP0 | 991.14 | 0 | 0 | 291.55 | 1139.25 | 0 |

TABLE 6b

Exemplary Plaster properties

| Formula | block | strength (kgf) | Edge length (mm) | Weight (grams) |
|---|---|---|---|---|
| 35WG8 | 1 | 110 | 24.5 | 15.9 |
|  | 2 | 240 | 24.72 | 17.2 |
|  | 3 | 290 | 23.86 | 17.2 |
|  | 4 | 263 | 25.29 | 15.8 |
|  | 5 | 267 | 24.58 | 17.1 |
|  | 6 | 214 | 24.03 | 18.1 |
| 35WG7 | 1 | 263 | 23.13 | 17.2 |
|  | 2 | 251 | 23.22 | 17.2 |
|  | 3 | 215 | 23.96 | 16.9 |
|  | 4 | 227 | 24.18 | 17.2 |
|  | 5 | 209 | 23.4 | 19.5 |
|  | 6 | 146 | 24.36 | 17.9 |
| 35WG6 | 1 | 152 | 24.65 | 19.7 |
|  | 2 | 300 | 24.53 | 17.4 |
|  | 3 | 266 | 24.61 | 17.5 |
|  | 4 | 242 | 25.02 | 17.8 |
|  | 5 | 283 | 24.78 | 17.2 |
|  | 6 | 230 | 24.27 | 17.5 |
| 35WG5 | 1 | 203 | 24.58 | 16.3 |
|  | 2 | 232 | 24.61 | 15.1 |
|  | 3 | 116 | 23.18 | 19.8 |
|  | 4 | 131 | 24.1 | 19.7 |
|  | 5 | 128 | 24.72 | 18.7 |
|  | 6 | 207 | 25.08 | 18.6 |
| 35WG4 | 1 | 200 | 24.79 | 18.5 |
|  | 2 | 205 | 23.73 | 17.6 |
|  | 3 | 222 | 24.25 | 19.8 |
|  | 4 | 268 | 24.59 | 19.8 |
|  | 5 | 235 | 25.19 | 19.1 |
|  | 6 | 238 | 24.46 | 18.7 |
| 35WG3 | 1 | 245 | 23.9 | 18.8 |
|  | 2 | 196 | 23.85 | 19 |
|  | 3 | 224 | 23.6 | 19.3 |
|  | 4 | 200 | 24.9 | 19.1 |
|  | 5 | 207 | 23.54 | 17.2 |
|  | 6 | 268 | 24.7 | 19.4 |

TABLE 6c

Additional Plaster properties

| Formula | block | strength (kgf) | Edge length (mm) | Weight (grams) |
|---|---|---|---|---|
| 35PFP10 | 1 | 202 | 24.13 | 12.87 |
|  | 2 | 189 | 23.44 | 13.07 |
|  | 3 | 170 | 24.05 | 12.37 |
|  | 4 | 119 | 23.32 | 12.78 |
|  | 5 | 208 | 23.51 | 12.8 |
|  | 6 | 164 | 23.4 | 12.32 |
| 35PFP8 | 1 | 171 | 24.05 | 12.66 |
|  | 2 | 132 | 24.69 | 13.53 |
|  | 3 | 159 | 25.28 | 14.01 |
|  | 4 | 148 | 25.13 | 12.45 |
|  | 5 | 146 | 22.03 | 12.53 |
|  | 6 | 139 | 21.25 | 11.94 |
| 35PFP6 | 1 | 383 | 22.22 | 12.15 |
|  | 2 | 252 | 22.64 | 12.4 |
|  | 3 | 353 | 24.03 | 12.17 |
|  | 4 | 308 | 22.7 | 12.83 |
|  | 5 | 402 | 23.86 | 11.94 |
|  | 6 | 287 | 24 | 12.12 |
| 35PFP4 | 1 | 471 | 24.19 | 12.74 |
|  | 2 | 323 | 23.97 | 11.56 |
|  | 3 | 249 | 24.13 | 13.25 |
|  | 4 | 264 | 25.18 | 12.63 |
|  | 5 | 307 | 24.77 | 13.11 |
|  | 6 | 300 | 23.67 | 12.38 |

TABLE 6c-continued

Additional Plaster properties

| Formula | block | strength (kgf) | Edge length (mm) | Weight (grams) |
|---|---|---|---|---|
| 35PFP2 | 1 | 142 | 22.16 | 12.99 |
|  | 2 | 164 | 22.58 | 12.95 |
|  | 3 | 160 | 23.25 | 12.07 |
|  | 4 | 112 | 24.12 | 13.06 |
|  | 5 | 144 | 24.19 | 12.26 |
|  | 6 | 100 | 23.77 | 12.79 |
| 35PFP0 | 1 | 110 | 23.25 | 12.4 |
|  | 2 | 113 | 23.51 | 12.31 |
|  | 3 | 126 | 22.94 | 11.69 |
|  | 4 | 86 | 22.49 | 11.84 |
|  | 5 | 71 | 23.51 | 11.77 |
|  | 6 | 124 | 23.48 | 11.87 |

TABLE 6d

Further Additional Plaster properties

| Formula | block | strength (kgf) | Edge length (mm) | Weight (grams) |
|---|---|---|---|---|
| 35PP10 | 1 | 176 | 23.52 | 11.39 |
|  | 2 | 163 | 24.31 | 11.45 |
|  | 3 | 110 | 23.13 | 10.87 |
|  | 4 | 112 | 23.71 | 12.34 |
|  | 5 | 103 | 24.33 | 11.65 |
|  | 6 | 185 | 23.05 | 11.54 |
| 35PP8 | 1 | 245 | 22.9 | 11.35 |
|  | 2 | 234 | 24.81 | 12.57 |
|  | 3 | 207 | 24.14 | 12.29 |
|  | 4 | 174 | 23.36 | 12.35 |
|  | 5 | 324 | 24.62 | 11.55 |
|  | 6 | 255 | 24.15 | 12.6 |
| 35PP6 | 1 | 231 | 23.68 | 12.16 |
|  | 2 | 310 | 23.79 | 11.65 |
|  | 3 | 225 | 23.83 | 12.32 |
|  | 4 | 297 | 23.71 | 12.77 |
|  | 5 | 311 | 23.9 | 12.84 |
|  | 6 | 326 | 24.2 | 13.11 |
| 35PP4 | 1 | 232 | 24.87 | 12.72 |
|  | 2 | 184 | 23.73 | 11.58 |
|  | 3 | 158 | 24.65 | 13.05 |
|  | 4 | 205 | 24.53 | 13.43 |
|  | 5 | 160 | 22.59 | 12.7 |
|  | 6 | 110 | 24.01 | 12.91 |
| 35PP2 | 1 | 123 | 24.24 | 10.7 |
|  | 2 | 140 | 24.19 | 12.32 |
|  | 3 | 169 | 23.86 | 12.12 |
|  | 4 | 90 | 24.4 | 11.8 |
|  | 5 | 142 | 24.19 | 12.42 |
|  | 6 | 157 | 24.02 | 10.67 |
| 35PP2 | 1 | 83 | 22.82 | 13 |
|  | 2 | 70 | 24.1 | 12.43 |
|  | 3 | 96 | 24.37 | 12.76 |
|  | 4 | 126 | 24.53 | 11.8 |
|  | 5 | 140 | 24.19 | 11.57 |
|  | 6 | 85 | 24.08 | 12.46 |

Example 8: Chopped Kenaf Core

Reducing average particle size of Kenaf core in blocks mixtures Commercially available Kenaf was 2 mm max particle size, with median of 0.85 mm. In order to investigate the possibility of using smaller Kenaf particle size than the commercially available material, hoping to get better PSD of the Kenaf with the cement and to create a mixture without addition of sand or gravel, the Kenaf was chopped using a blade chopper and reduced to below 2.36 mm size. The purpose was to create desired Kenaf PSD in the mixture so that it will be sufficient for both reducing thermal conductivity and increase of strength, so that the addition of gravel or sand will not be necessary.

Results presented in table 7 show strength and weight of the hardened mixtures. Formulation 10 and 38 were made with chopped Kenaf core which was passed through a 2.36 mm screen.

This example illustrates that the strength of the mixture did not improve by improving the psd of the Kenaf, however the weight of the mixture was reduced by ~25%. Reduction of mixture weight corresponds to reduction of thermal conductivity. This example shows the importance of the Kenaf PSD to the thermal performance, however relying only on Kenaf as a filler is not sufficient to gain high strength mixture, even if the Kenaf PSD is improved significantly. Improving PSD means that the new PSD is closer to the optimal range that we choose as target. Physically it means that any gap between coarse particles is being filled with smaller particles and that the remaining smaller gaps are being filled with even smaller particles and so on, so that finally the fillers are in the best particle density and packing as they can.

TABLE 7

Exemplary Block Properties

| Formula | Strength [kgf] | Width cm | Length cm | Weight grams |
|---|---|---|---|---|
| 10 | 1122 | 10.3 | 10.3 | 812.54 |
|  | 986 | 10.2 | 10.3 | 860.2 |
|  | 1104 | 10.2 | 10.1 | 775.98 |
| 38 | 876 | 10.2 | 10.3 | 525.41 |
|  | 762 | 10.2 | 10.3 | 626.8 |
|  | 900 | 10.2 | 10.2 | 646.6 |

Example 9

Additional Testing of Sand in Plaster Mixtures

The purpose of this mixture was to understand if natural sand can have a meaningful influence on strength. This mixture is about 8% vol. replacement of Kenaf powder by natural sand. It changes the strength from 0.3 MPa to 12 MPa. This demonstrated the potential of sand replacement as a way to increase strength and then we tried to change the mixture to have good PSD and to reduce sand as much as possible and increase Kenaf powder as much as possible.

Results presented in table 8a and 8b indicate initial sand based mixtures to increase its strength.

This example was conducted prior to example 7.

TABLE 8a

Formula 35 for plaster

| sand | Ratio water:cement | fibers | Kenaf Powder (1) | Gray cement |
|---|---|---|---|---|
| 509.2 gram | 0.55 | 7.3 gram | 246.8 gram | 1366.3 gram |

TABLE 8b

Formula 35 properties

| block | Strength tons | Width (mm) | Length (mm) | weight |
|---|---|---|---|---|
| 1 | 10< | 100.81 | 100.13 | 1360.5 |
| 2 | 13 | 100.84 | 100.65 | 1305.7 |
| 3 | 12 | 100.46 | 100.6 | 1321.2 |

Example 10

Example 11: Pressure Vibration

Influence of Pressure and Vibration Over the Mixture Compressive Strength

In order to test if pressure is needed and how much and if vibration is needed in order to create higher strength mixtures an additional series of experiments was conducted. All experiments for this field was done over 100×100×100 mm cubes.

Results presented in tables 11a and 11b as well as in FIGS. 5, 6, 7 and 8 suggest that pressure has a positive influence on the block mixtures compressive strength, however too high pressure can cause negative response. Different Kenaf percentage respond differently to the pressure and vibration, while for high Kenaf percentage of 90%, both vibration and higher pressure improve the product strength. These results suggest two things that can happen due to pressure:

1. that the Kenaf being compressed can extract unwanted materials, this will cause harmful reactions with the cementitious matrix.
2. because of the Kenaf elasticity it makes it spring back after pressing and releasing thus the contraction destroy the mixture at high pressures.

Figure 5:
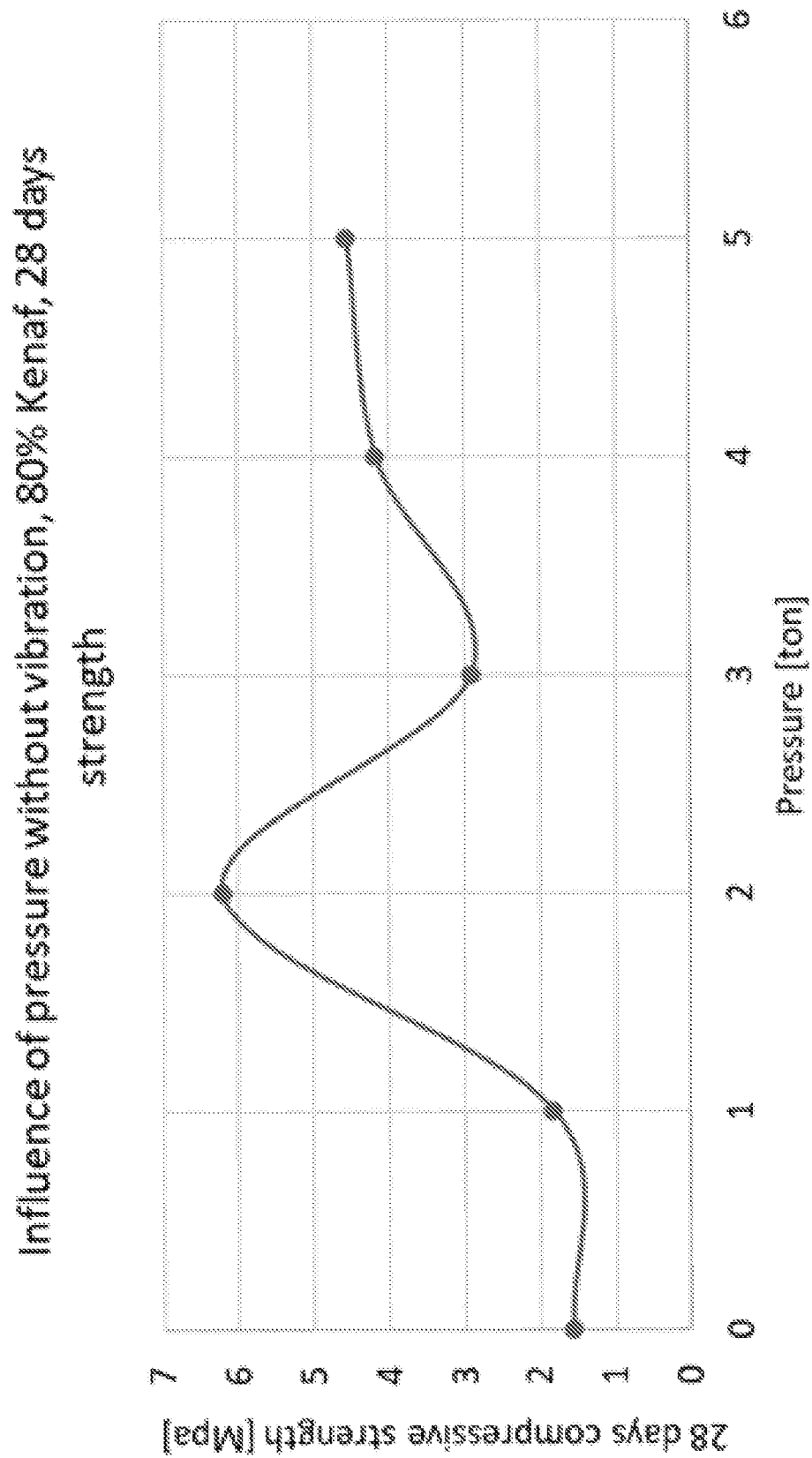
FIG. 5 is a graph of compressive strength in Mpa at 28 days as a function of pressure in tons applied during casting without vibration according to some exemplary embodiments of the invention.

FIG. 5 shows that a 80% Kenaf mixture needs about 20 Kg/cm$^2$ (+1-5%) to develop highest compressive strength (without vibration) having four times higher strength compared to no pressure mix.

Figure 6:
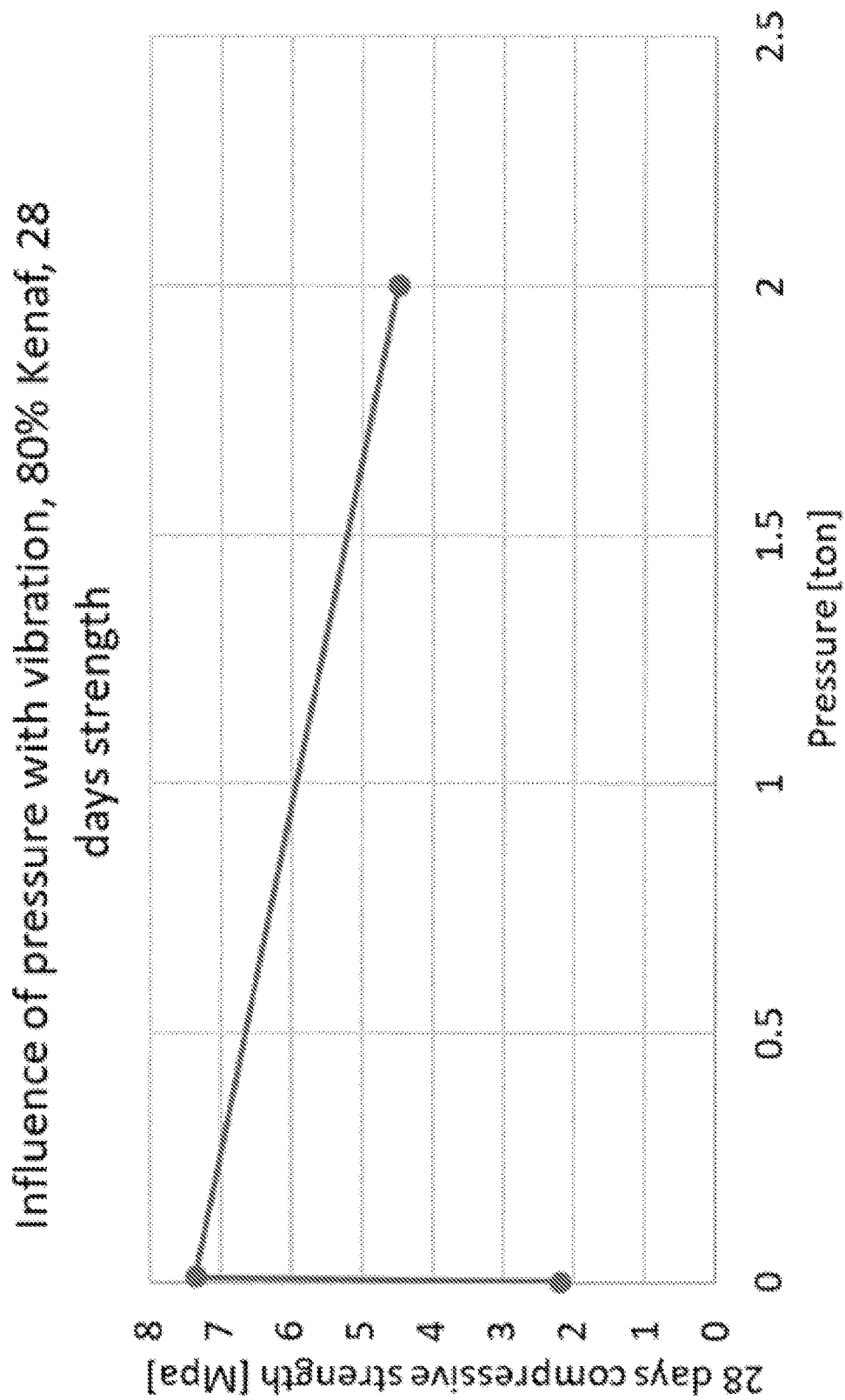
FIG. 6 is a graph of compressive strength in Mpa at 28 days as a function of pressure in tons applied during casting with vibration according to some exemplary embodiments of the invention.

FIG. 6 shows that the vibration to the 80% Kenaf mixture has higher influence than the pressure without the vibration, but it is true only when the vibration is applied with low pressure simultaneously.

Figure 7:
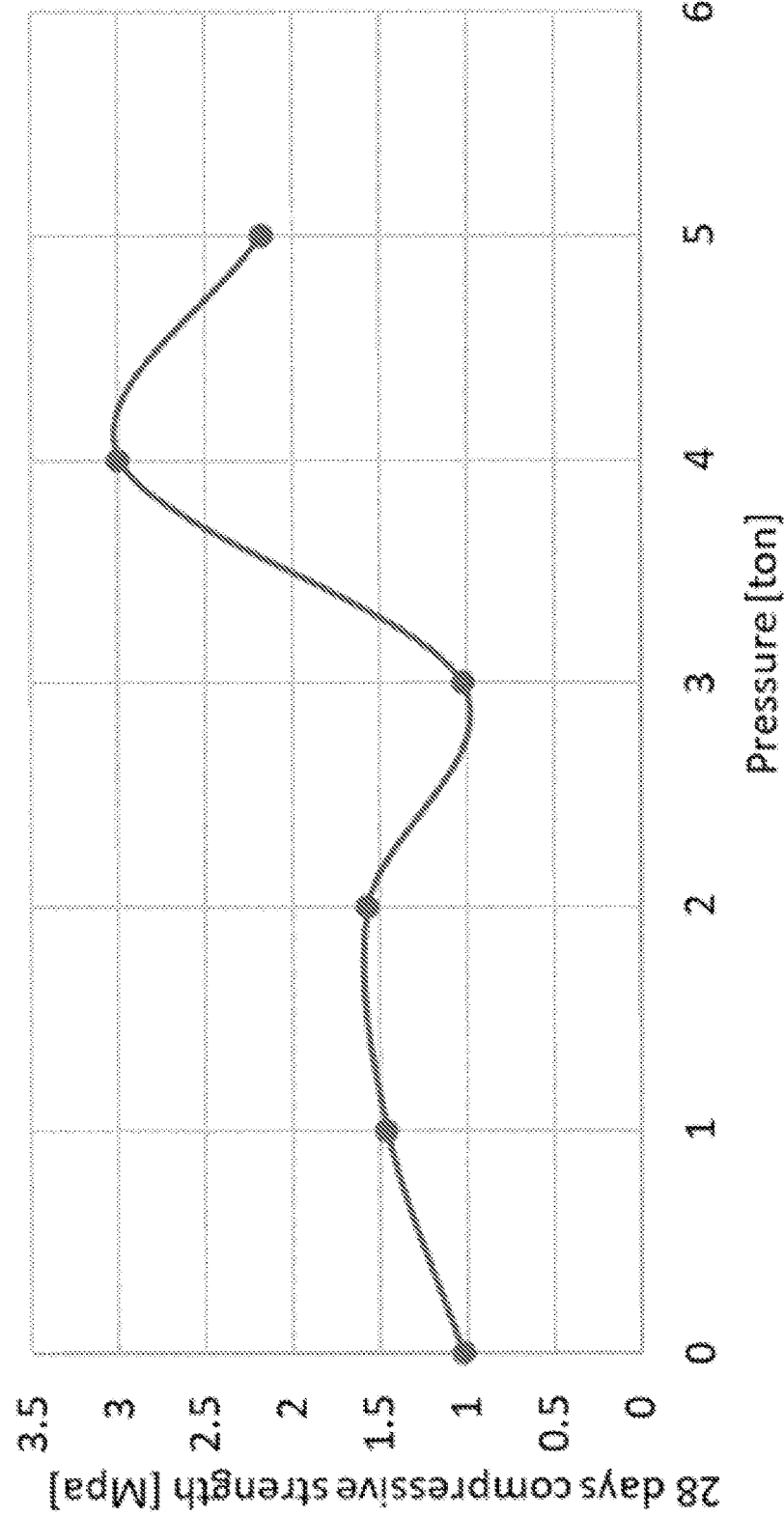
FIG. 7 is a graph of compressive strength in Mpa at 28 days as a function of pressure in tons applied during casting without vibration according to some exemplary embodiments of the invention.

FIG. 7 is similar to FIG. 5 but for a mixture with 90% Kenaf, the mixture needs higher pressure of about 40 Kg/cm$^2$ (+1-5%) but this induce only three times higher strength compared to no pressure mixture. In other words, the 90% Kenaf mix is much weaker than the 80% Kenaf mix and moreover it corresponds poorer to the pressure.

Figure 8:
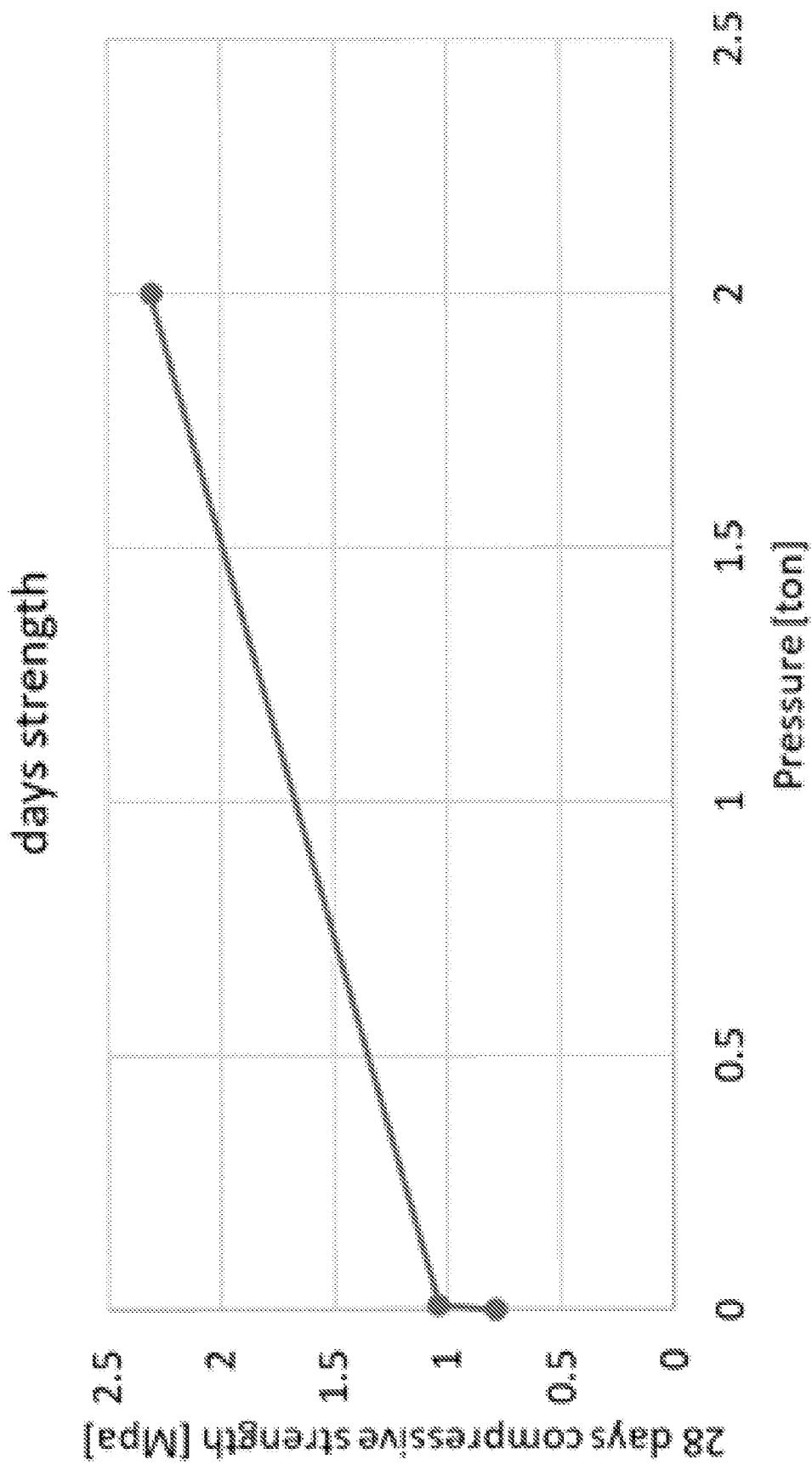
FIG. 8 is a graph of compressive strength in Mpa at 28 days as a function of pressure in tons applied during casting with vibration according to some exemplary embodiments of the invention.
Figure 9:
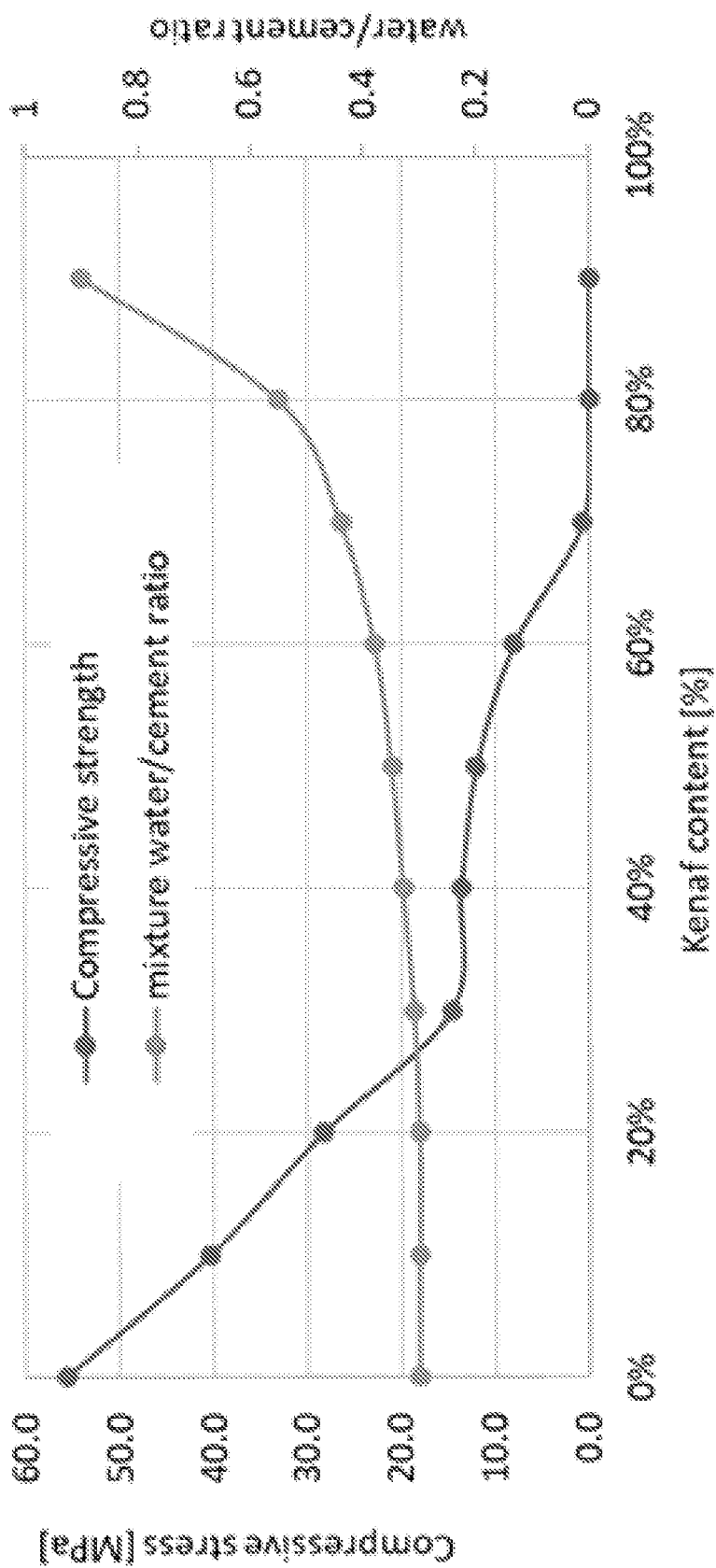
FIG. 9 is a graph of compressive strength in Mpa at 28 days as a function of % Kenaf content (Y axis left side) superimposed on a graph of water cement ratio as a function of % Kenaf content (Y axis right side) according to some exemplary embodiments of the invention.
Figure 10:
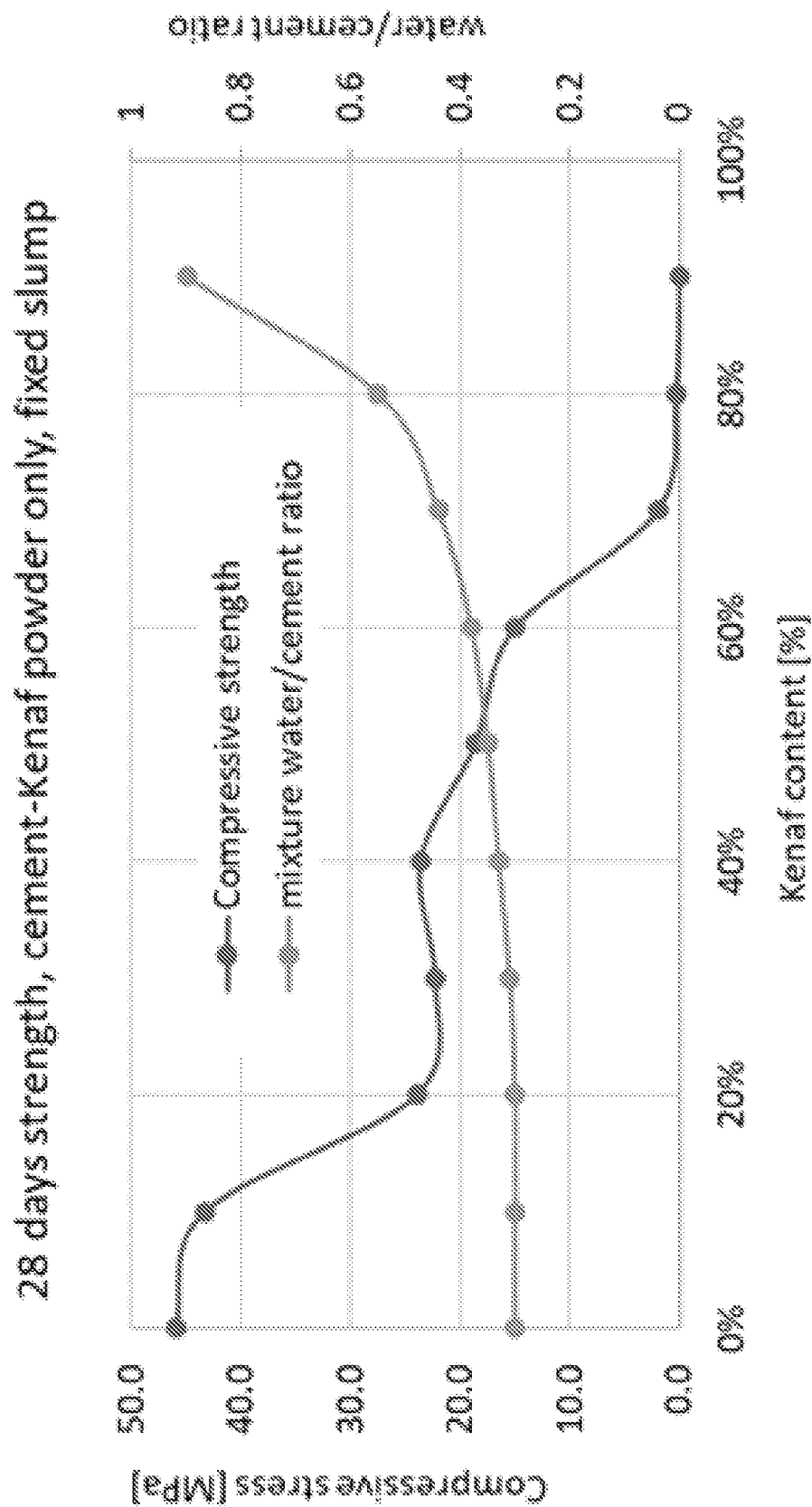
FIG. 10 is a graph of compressive strength in Mpa at 28 days as a function of % Kenaf content (Y axis left side) superimposed on a graph of water cement ratio as a function of % Kenaf content (Y axis right side) according to some exemplary embodiments of the invention.
Figure 11:
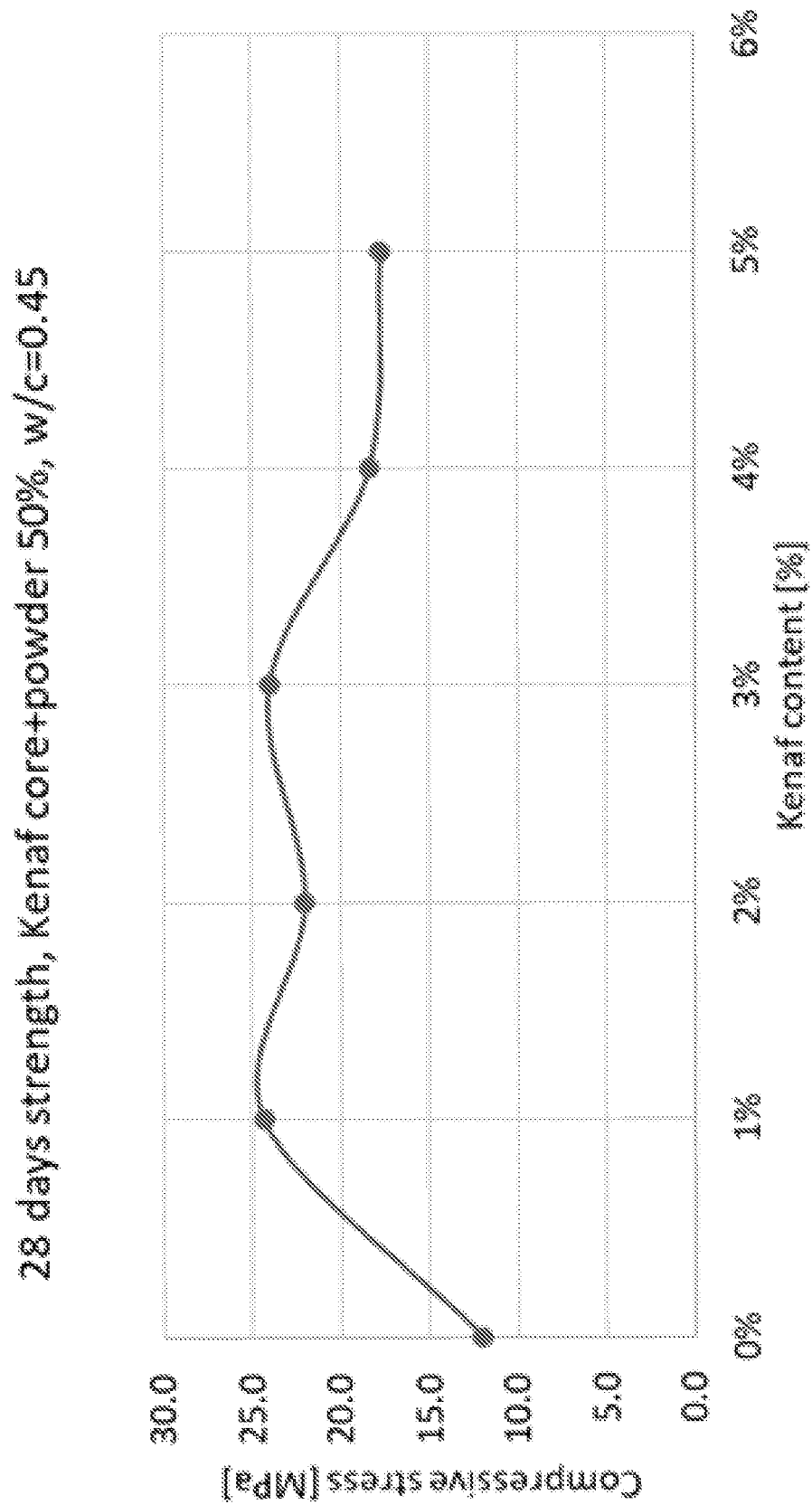
FIG. 11 is a graph of compressive strength in Mpa at 28 days as a function of % Kenaf content according to some exemplary embodiments of the invention.
Figure 12:
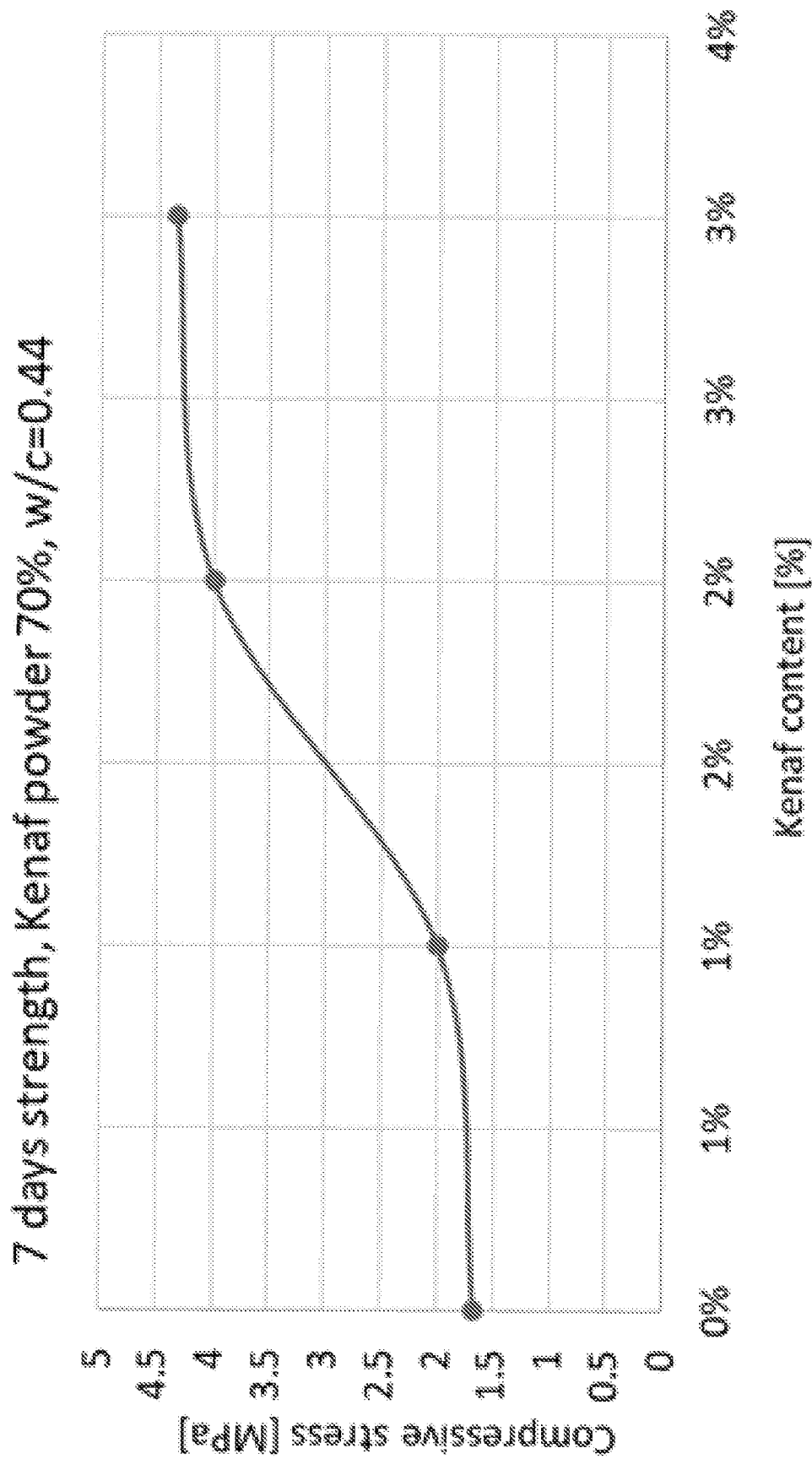
FIG. 12 is a graph of is compressive strength in Mpa at 7 days as a function of % Kenaf content according to some exemplary embodiments of the invention.
Figure 13:
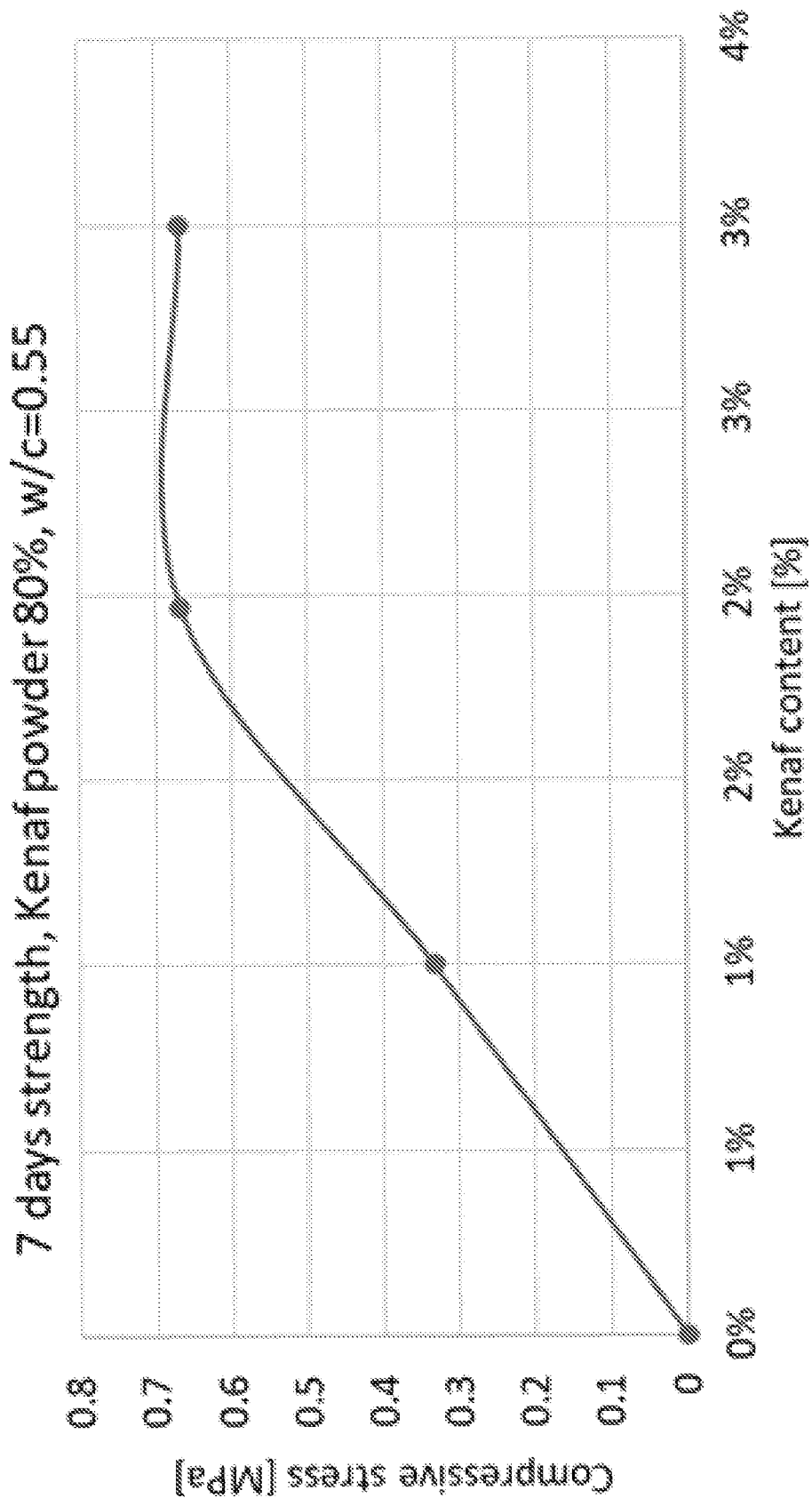
FIG. 13 is a graph of compressive strength in Mpa at 7 days as a function of % Kenaf content according to some exemplary embodiments of the invention.
Figure 14:
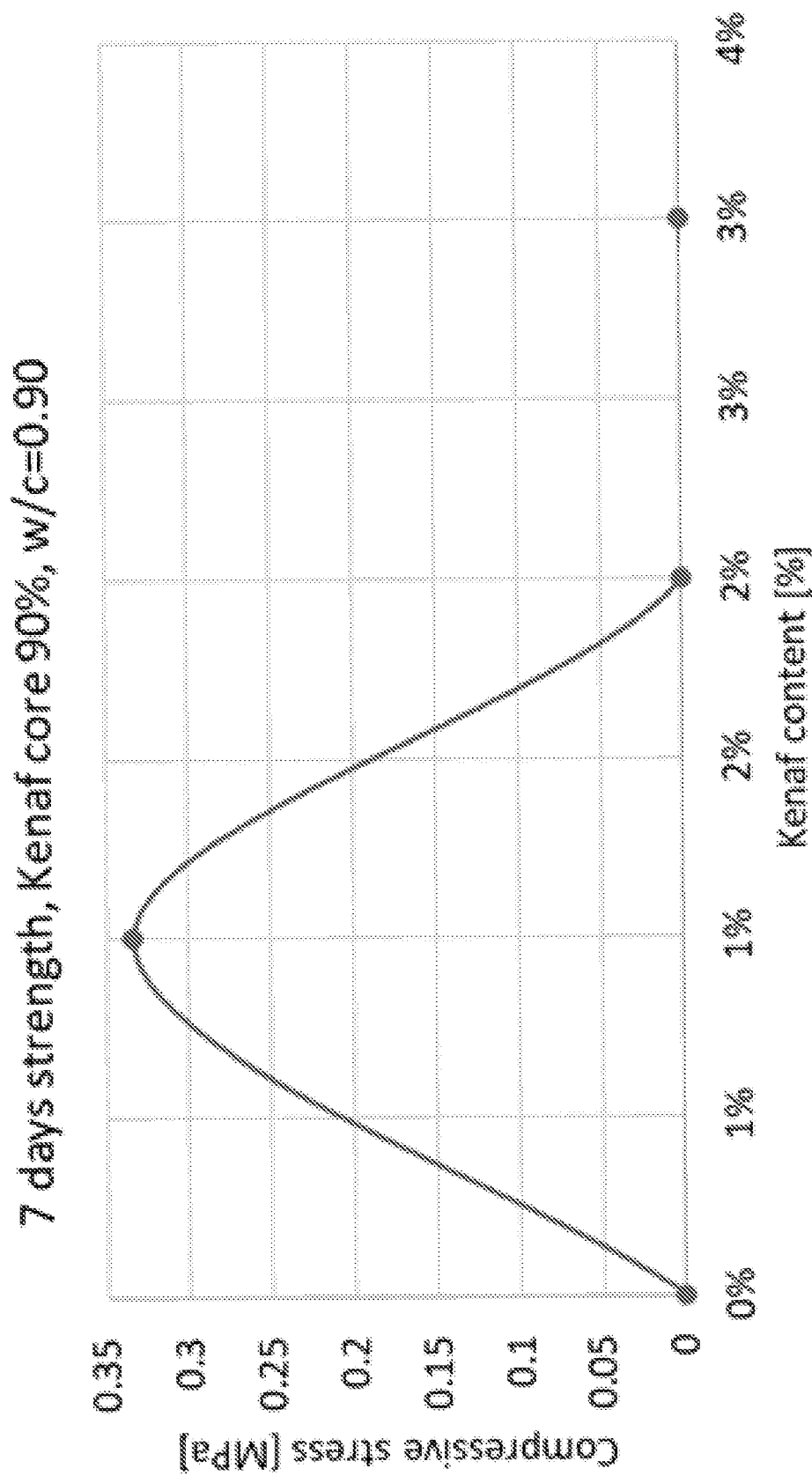
FIG. 14 is a graph of compressive strength in Mpa at 7 days as a function of % Kenaf content according to some exemplary embodiments of the invention.
Figure 15:
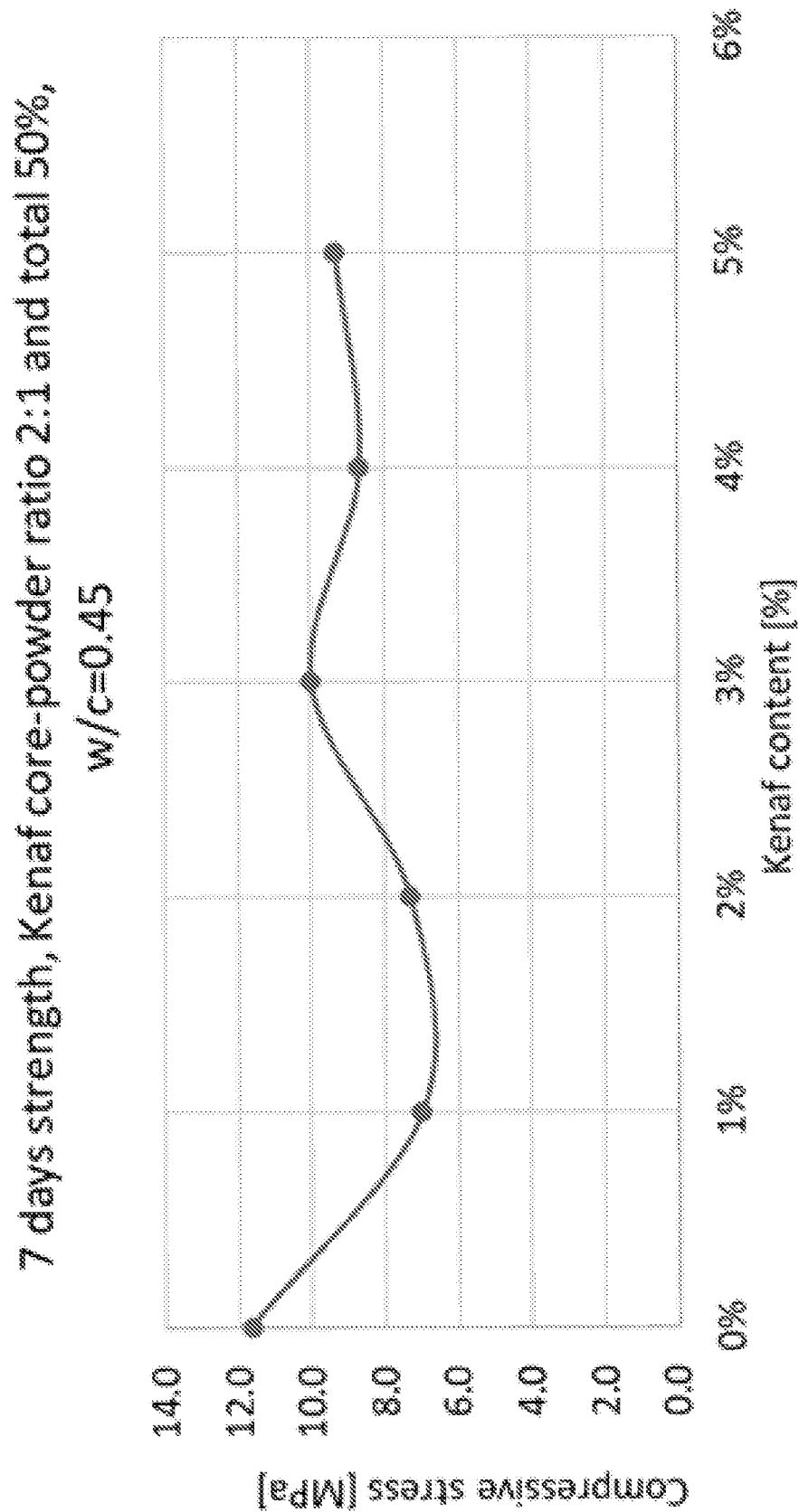
FIG. 15 is a graph of is a graph of compressive strength in Mpa at 7 days as a function of % Kenaf content according to some exemplary embodiments of the invention.

FIG. 8 shows that vibration to a 90% Kenaf mixture has no real benefit compared to pressure only, only slight difference is observed.

This example illustrates that a pressure of about 20 Kg/cm$^2$ produced the best results for a 80% Kenaf mixture. To reach close to 90% Kenaf mix the use of only pressure or vibration is not enough and thus need the natural aggregate addition.

This example illustrates that vibration can be either constructive or destructive, depending on when and how the vibration is applied during the pressing. Moreover, if the vibration is applied before or beyond the pressing the results are destructive.

TABLE 11a

Influence of pressure and vibration on formula 9 (80% Kenaf and 20% cement)

| Experiment | Pressure | Vibration | compression strength [Mpa] |
|---|---|---|---|
| 1 | None | None | 1.57 |
| 2 | None | 1 minute | 2.19 |
| 3 | By hand with iron rod | 1 minute | 7.36 |
| 4 | 1 ton | None | 1.83 |
| 5 | 2 ton | None | 6.22 |
| 8 | 3 ton | None | 2.91 |
| 9 | 4 ton | None | 4.17 |
| 6 | 5 ton | None | 4.55 |
| 7 | 2 ton | 1 minute | 4.49 |

TABLE 11b

Influence of pressure and vibration on formula 10 (90% Kenaf and 10% cement)

| Experiment | Pressure | Vibration | compression strength [Mpa] |
|---|---|---|---|
| 1 | None | None | 1.02 |
| 2 | None | 1 minute | 0.79 |
| 3 | By hand | 1 minute | 1.04 |
| 4 | 1 ton | None | 1.46 |
| 5 | 2 ton | None | 1.57 |
| 8 | 3 ton | None | 1.03 |
| 9 | 4 ton | None | 3.00 |
| 6 | 5 ton | None | 2.18 |
| 7 | 2 ton | 1 minute | 2.31 |

Example 12

Influence of Kenaf on Different Matrices

In order to test if Kenaf derived material can be inserted to other matrices such as white cement, gypsum and quicklime a series of matrices were prepared. The white vs. gray Portland cement is detailed in table 12 and tested for compressive strength after 7 days.

Quicklime and the gypsum undergo a destructive reaction with Kenaf and the strength is extremely low (data not shown). The combination of Kenaf with its high water absorption, together with gypsum with its rapid setting properties, makes such mixture to be inferior and hard to work on. The lime does not create high strength with the Kenaf, also for plaster based on cement and addition of lime made inferior results compared to cement based only.

TABLE 12

Compressive strength of different Kenaf mixtures

| 7 days compressive strength [ton] | | | Water/cement ratio | Kenaf fiber content | Kenaf content | Kenaf formation | Cement content | Cement Type | Mixture number |
|---|---|---|---|---|---|---|---|---|---|
| 4 | 1 | 1 | 0.44 | 1% | 70% | Powder | 29% | Gray | 32 |
| 4 | 2 | 0 | 0.44 | 1% | 70% | Powder | 29% | White | 32 |
| 2 | 5 | 5 | 0.44 | 2% | 70% | Powder | 28% | Gray | a33 |
| 2 | 5 | 4 | 0.44 | 2% | 70% | Powder | 28% | White | a33 |
| 4 | 5 | 4 | 0.44 | 3% | 70% | Powder | 27% | Gray | a33 |
| 4 | 1 | 2 | 0.44 | 3% | 70% | Powder | 27% | White | a33 |
| 0 | 0 | 1 | 0.55 | 1% | 80% | Powder | 19% | Gray | 34 |
| 0 | 1 | 1 | 0.55 | 1% | 80% | Powder | 19% | White | 34 |
| 1 | 1 | 0 | 0.55 | 2% | 80% | Powder | 18% | Gray | 35 |
| 1 | 2 | 0 | 0.55 | 2% | 80% | Powder | 18% | White | 35 |
| 1 | 1 | 0 | 0.55 | 3% | 80% | Powder | 17% | Gray | 36 |
| 1 | 0 | 0 | 0.55 | 3% | 80% | Powder | 17% | White | 36 |
| 0 | 1 | 0 | 0.9 | 1% | 89% | Core | 10% | Gray | 37 |
| 0 | 0 | 0 | 0.9 | 1% | 89% | Core | 10% | White | 37 |
| 0 | 0 | 0 | 0.9 | 2% | 88% | Core | 10% | Gray | 38 |
| 0 | 0 | 0 | 0.9 | 2% | 88% | Core | 10% | White | 38 |
| 0 | 0 | 0 | 0.9 | 3% | 87% | Core | 10% | Gray | 39 |
| 0 | 0 | 0 | 0.9 | 3% | 87% | Core | 10% | White | 39 |
| 0 | 0 | 0 | 0.44 | 1% | 70% | Powder | 29% | Gray | 40 |
| 0 | 1 | 0 | 0.44 | 1% | 70% | Powder | 29% | White | 40 |
| 1 | 0 | 0 | 0.44 | 2% | 70% | Powder | 28% | Gray | 41 |
| 0 | 0 | 0 | 0.44 | 2% | 70% | Powder | 28% | White | 41 |
| 1 | 1 | 0 | 0.44 | 3% | 70% | Powder | 27% | Gray | 42 |
| 1 | 1 | 0 | 0.44 | 3% | 70% | Powder | 27% | White | 42 |

Results presented in table 12 indicate that white cement produced lower strength than gray cement, this is although the white cement is a 52.5 type while the cement is 42.5 type (the white cement ought to be stronger).

The cement comparisons were done for both the plaster and the block mixtures, it was done for Kenaf contents between 70-89% (core particles or powder) and was done for different amounts of Kenaf fibers between 1-3%.

This example illustrates that various Kenaf derived materials can be used in various types of building materials with acceptable strength.

Example 13: Additional Exemplary Formulations

Influence of Kenaf Components and Mixtures on Properties of Cement Based Render

Different mixtures were prepared in order to test the influence of Kenaf content on cement based mixtures. Specifically the mixtures were prepared to show how amount, ratio of components and specific Kenaf formation influence the mechanical properties of cement based mixtures. Different mixtures were prepared, some containing Kenaf core or Kenaf powder separately, others combining two or more Kenaf ingredients in a single mixtures to achieve a desired particle size distribution. One goal was to achieve a high quantity of Kenaf in the mixture while maintaining acceptable properties. All mixtures where prepared using CEM II 42.5 B-LL, giving them workability as required by standard to renders and plasters, using only water to get the workability needed. The same could have been done with CEM I which is more expansive, however slight reduction of cement content can be addressed when using the CEM I cement.

Table 13 is the same as table 2, the first is based on percentage and the second is on weights/parts.

FIGS. 9-15 and table 13 are all included in example 3.

The figures show the table in a graphic way. With the figures it is possible to see the influence of vibration with/without, the influence of Kenaf/cement content in the mixture, the influence of mixture composition over the water demand for mixing, and eventually those tests were the beginning of the research to define the boundaries of mixture composition by the outcome compressive test results. The rest of the research dealt with how to deal with the most problematic mixture based on table 13 and make it have the largest Kenaf quantity while having the required mechanical properties.

The mixtures that were prepared at the early stages of the R&D and their mechanical/physical properties as in example 3.

This example illustrates that up to 60% volume content of Kenaf can be applied without reducing the mixture strength to critical non-constructive level, while the Kenaf is untreated with any substances, however its thermal performance is not competitive enough. At the 70% level, only by introducing additional Kenaf fibres it can help achieving mixtures with sufficient strength. 80-90% level of Kenaf requires sophisticated approach to deal with the low bond strength of the Kenaf and the cement, to deal with the Kenaf high water absorption, and to enable strong matrix that overcome the weakness of the Kenaf. The high volumes of Kenaf to levels of 80-90% is needed in order to achieve novel and unique thermal insulation abilities.

TABLE 13 formulations containing plant material

| Water:cement ratio | Kenaf cont. 3 | Kenaf form. 3 | Kenaf cont. 2 | Kenaf form. 2 | Kenaf cont. 1 | Kenaf form. 1 | Cement Type | Cement Type | Mixture number |
|---|---|---|---|---|---|---|---|---|---|
| 0.3 | | | | | 0% | Core | 100% | Gray | 1 |
| 0.3 | | | | | 10% | Core | 90% | Gray | 2 |
| 0.3 | | | | | 20% | Core | 80% | Gray | 3 |
| 0.31 | | | | | 30% | Core | 70% | Gray | 4 |
| 0.33 | | | | | 40% | Core | 60% | Gray | 5 |
| 0.35 | | | 0% | Fibres | 50% | Core | 50% | Gray | 6 |
| 0.38 | | | | | 60% | Core | 40% | Gray | 7 |
| 0.44 | | | | | 70% | Core | 30% | Gray | 8 |
| 0.55 | | | | | 80% | Core | 20% | Gray | 9 |
| 0.9 | | | | | 90% | Core | 10% | Gray | 10 |
| 0.3 | | | | | 0% | Powder | 100% | Gray | 11 |
| 0.3 | | | | | 10% | Powder | 90% | Gray | 12 |
| 0.3 | | | | | 20% | Powder | 80% | Gray | 13 |
| 0.31 | | | | | 30% | Powder | 70% | Gray | 14 |
| 0.33 | | | | | 40% | Powder | 60% | Gray | 15 |
| 0.35 | | | | | 50% | Powder | 50% | Gray | 16 |
| 0.38 | | | | | 60% | Powder | 40% | Gray | 17 |
| 0.44 | | | 0% | Fibres | 70% | Powder | 30% | Gray | 18 |
| 0.55 | | | 0% | Fibres | 80% | Powder | 20% | Gray | 19 |
| 0.9 | | | 0% | Fibres | 90% | Powder | 10% | Gray | 20 |
| 0.45 | | | 1% | Fibres | 49% | Core | 50% | Gray | 21 |
| 0.45 | | | 2% | Fibres | 48% | Core | 50% | Gray | 22 |
| 0.45 | | | 3% | Fibres | 47% | Core | 50% | Gray | 23 |
| 0.45 | | | 4% | Fibres | 46% | Core | 50% | Gray | 24 |
| 0.45 | | | 5% | Fibres | 45% | Core | 50% | Gray | 25 |
| 0.45 | 0% | Fibres | 17% | Powder | 33% | Core | 50% | Gray | 26 |
| 0.45 | 1% | Fibres | 17% | Powder | 33% | Core | 49% | Gray | 27 |
| 0.45 | 2% | Fibres | 17% | Powder | 33% | Core | 48% | Gray | 28 |
| 0.45 | 3% | Fibres | 17% | Powder | 33% | Core | 47% | Gray | 29 |
| 0.45 | 4% | Fibres | 17% | Powder | 33% | Core | 46% | Gray | 30 |
| 0.45 | 5% | Fibres | 17% | Powder | 33% | Core | 45% | Gray | 31 |

While some embodiments of the invention have been described by way of illustration, it will be apparent that the invention can be carried into practice with many modifications, variations and adaptations, and with the use of numerous equivalents or alternative solutions that are within the scope of persons skilled in the art, without departing from the spirit of the invention or exceeding the scope of the claims.

The invention claimed is:

1. A masonry block comprising
   (i) cement and sand and/or gravel, and
   (ii) at least 15.6% kenaf plant derived material by weight wherein the masonry block has a specific gravity of 650-790 Kg/m³ and a compressive strength of at least 6.5 Mpa; and wherein said Kenaf derived plant material has a particle size distribution (P(D)) as determined by $P(D)=(D/Dmax)^q$ having a range of $0.5 \leq q \leq 1.4$, where D represents a given particle diameter;

Dmax represents a maximum particle diameter;

P(D) represents a cumulative fraction that consists of particles with diameters less than or equal to D; and q is a parameter characterizing distribution of particle sizes.

2. The masonry block according to claim 1, comprising at least 15% Na silicate.

3. The masonry block according to claim 2, wherein said Na silicate seals the kenaf plant material.

4. The masonry block according to claim 1, comprising not more than 27.2% sand.

5. The masonry block according to claim 1, comprising not more than 18.7% gravel.

6. The masonry block according to claim 1, comprising not more than 46.4% cement.

7. The masonry block according to claim 1, having a thermal conductivity of not more than about 0.11 W/m*K.

8. The masonry block according to claim 1, having a sound absorption coefficient value of 0.5.

9. The masonry block according to claim 1, comprising at least 17.8% kenaf plant material and having a sound absorption coefficient value of 0.35.

10. The masonry block according to claim 1, wherein said Kenaf derived plant material comprises kenaf core.

11. The masonry block according to claim 1, comprising gravel, wherein said Kenaf derived plant material comprises kenaf core having a smaller particle size than said gravel.

12. The masonry block according to claim 1, obtained by a method comprising:
    (a) combining water glass with said Kenaf derived plant material;
    (b) mixing said Kenaf derived plant material with said water glass and drying the mixture to form a dry mix, said mixing and drying is for a time sufficient to cause sealing of a surface of said Kenaf derived plant material; and
    (c) mixing the dry mix with cement and sand and/or gravel.

13. The masonry block according to claim 12, wherein said water glass comprises sodium silicate.

14. The masonry block according to claim 12, comprising mixing sealed Kenaf derived plant material with cement and sand and/or gravel to produce a dry mix; and mixing the dry mix with water.

* * * * *